(12) United States Patent
Huang

(10) Patent No.: US 9,405,457 B2
(45) Date of Patent: Aug. 2, 2016

(54) APPARATUS AND SYSTEMS FOR ENHANCED TOUCH SCREEN OPERATION

(76) Inventor: Jay J. Huang, Eatontown, NJ (US)

( * ) Notice: Subject to any disclaimer, the term of this patent is extended or adjusted under 35 U.S.C. 154(b) by 309 days.

(21) Appl. No.: 13/251,251

(22) Filed: Oct. 1, 2011

(65) Prior Publication Data

US 2013/0082938 A1    Apr. 4, 2013

(51) Int. Cl.
| | |
|---|---|
| G06F 3/0488 | (2013.01) |
| G06F 3/01 | (2006.01) |
| G06F 3/033 | (2013.01) |
| G06F 3/039 | (2013.01) |
| G06F 3/02 | (2006.01) |

(52) U.S. Cl.
CPC .............. *G06F 3/0488* (2013.01); *G06F 3/011* (2013.01); *G06F 3/033* (2013.01); *G06F 3/039* (2013.01); *G06F 3/02* (2013.01)

(58) Field of Classification Search
None
See application file for complete search history.

(56) References Cited

U.S. PATENT DOCUMENTS

| | | | |
|---|---|---|---|
| 5,572,573 A | 11/1996 | Sylvan | |
| 5,584,054 A * | 12/1996 | Tyneski et al. | 455/566 |
| 5,742,894 A | 4/1998 | Jambhekar | |
| 5,818,924 A | 10/1998 | King | |
| 5,821,881 A | 10/1998 | Fischer | |
| 6,492,978 B1 | 12/2002 | Selig | |
| 6,636,203 B1 * | 10/2003 | Wong et al. | 345/173 |
| 6,667,738 B2 | 12/2003 | Murphy | |
| 6,996,426 B2 | 2/2006 | Granberg | |
| 7,277,081 B2 | 10/2007 | Ukita | |
| 7,403,191 B2 | 7/2008 | Sinclair | |
| 7,432,911 B2 | 10/2008 | Skarine | |
| 7,479,943 B1 | 1/2009 | Lunsford | |
| 7,659,885 B2 | 2/2010 | Kraus | |
| 2002/0054030 A1 * | 5/2002 | Murphy | 345/173 |
| 2003/0030628 A1 * | 2/2003 | Sato et al. | 345/173 |
| 2004/0180307 A1 * | 9/2004 | Graham | 433/118 |
| 2006/0256090 A1 | 11/2006 | Huppi | |
| 2009/0320070 A1 * | 12/2009 | Inoguchi | 725/40 |
| 2010/0097327 A1 | 4/2010 | Wadsworth | |
| 2010/0134428 A1 * | 6/2010 | Oh | 345/173 |
| 2010/0302168 A1 | 12/2010 | Giancarlo | |
| 2010/0315348 A1 | 12/2010 | Jellicoe | |
| 2011/0035695 A1 | 2/2011 | Fawcett | |
| 2011/0109594 A1 | 5/2011 | Marcus | |
| 2011/0157056 A1 * | 6/2011 | Karpfinger | 345/173 |
| 2011/0184824 A1 | 7/2011 | George | |
| 2011/0199325 A1 * | 8/2011 | Payne | 345/173 |
| 2011/0227871 A1 | 9/2011 | Cannon | |

FOREIGN PATENT DOCUMENTS

| | | |
|---|---|---|
| EP | 0813328 A3 | 4/1999 |
| JP | 07-056672 | 3/1995 |
| WO | WO9741677 A1 | 11/1997 |
| WO | WO2004025546 A1 | 3/2004 |
| WO | WO 2009008686 A2 * | 1/2009 |

* cited by examiner

*Primary Examiner* — Seokyun Moon

(57) ABSTRACT

Apparatus and systems are disclosed to enhance the user interface of a touch screen device. In one embodiment, a button (114) is disposed over a touch activation area (112) of a touch screen device (110) by a retainer (116) hingedly connected to a hinge bracket (118) affixed to the device housing by a double-sided tape (120). The button relays a user's touch action to the touch sensitive screen and provides the user with tactile cues and feedback. Systemic optimizations are also provided to streamline the operation of the touch screen device adopting such an apparatus.

23 Claims, 21 Drawing Sheets

APPARATUS AND SYSTEMS FOR ENHANCED TOUCH SCREEN OPERATION

CROSS-REFERENCE TO RELATED APPLICATIONS

Not Applicable

FEDERALLY SPONSORED RESEARCH

Not Applicable

SEQUENCE LISTING OR PROGRAM

Not Applicable

BACKGROUND

This invention relates to the operation of a touch screen. A touch screen is an electronic touch-sensitive display capable of detecting the presence and location of one or multiple touches within the graphical display area and actuating programmed commands accordingly. Being flexible, simple, and intuitive, user interfaces based on touch screen technology have become essential to a large variety of electronic devices such as personal digital assistants, mobile phones, electronic book readers, computers, navigation devices, and point-of-use terminals.

A typical touch screen features a uniformly constructed planar surface having a plurality of touch activation areas correlative with predetermined functional commands. Although these touch activation areas often display graphics that visually emulate conventional buttons or keys, a user's experience of touching these buttons or keys is fundamentally different due to the lack of tactile cues and feedback that conventional buttons and keys would provide. As a result, a user will have to rely on visual sense to identify a touch target on the touch screen and align a touch instrument with the target to actuate an intended command. Additionally, a user frequently uses a finger as the touch instrument to interact with a touch screen, which can further elevate the difficulty of operation because a touch screen is typically less responsive to a human finger than to a more rigid and pointed apparatus such as a stylus or a shaped button. These factors contribute to touch screen devices being inefficient, error-prone, and frustrating or even unsafe to operate in many situations especially where the circumstances of operation do not permit extended visual involvement.

One of such situations is the use of a portable navigation device, commonly known as a Global Positioning System (GPS) device, while operating a mobile vehicle. Most drivers find it necessary or very beneficial to view additional information or adjust map scale on the device screen while driving. This is usually done by touching one or more emulated buttons on the touch screen. However, the amount of visual attention paid to identifying and locating correct touch controls can be excessive, consequently leading to unsafe driving. Other scenarios of conventional touch screen interfaces being undesirable or less-efficient include playing video games on a handheld touch screen device such as a mobile phone, entering information using emulated keys on a touch screen, controlling a production line with a touch screen terminal, and so on.

Prior to this invention, there were practices offering alternative interfaces to touch screens. For example, a voice command system can be incorporated into touch screen devices, such as a GPS unit, to replace certain touch screen functions. However, it is an expensive feature and is not nearly as reliable as touch controls due to current state of the technology and its inherent shortcomings such as sensitivity to noise in the operating environment. Another alternative is to add physical buttons somewhere on the housing of a touch screen device, but similarly their benefits appear to be outweighed by their added complexity, increased device size, and less intuitive user-interfaces.

There were also approaches intended to alleviate this problem with simulated touch sensation. One method is to include electric motors with vibration-generating mechanisms inside touch screen devices so that a user's touch actuation of a touch command can also trigger some vibrating effects for tactile feedback. Although it may be desirable to have at least this kind of simulated tactile confirmation upon actuating a touch command, it leaves the needs for better identification and location of touch targets unaddressed.

Others attempts have also been brought forward around the idea of adding tactile feels base on certain hardware structures. One example was seen in the mobile phone industry where a touch screen phone was equipped with a flip cover having physical keys corresponding to touch activation commands on the touch screen. When the cover is closed relative to the touch screen, it allows a user to experience a traditional push-key type keypad by transmitting user's touch pressure to touch activation areas beneath the cover. If the user wants to view and use other functions on the same touch screen area without inference, the cover must be flipped open and typically disposed at a fixed angle to the touch screen, occupying a large space. This type of devices has not gained much popularity, however, possibly due to the drawbacks including much increased device form factor especially when the cover is in the open position as well as blocked or diminished views of the touch screen when the cover is closed.

For another example, some have conceived the use of a flexible membrane, such as a screen-protector type overlay, with some tactile surface shapes covering at least a portion of a touch screen where emulated keyboard is present. The apparent problem with this method is the difficulty in removing and re-applying the overlay as needed, and there has not been evidence of systemic considerations and designs to actually support permanent presence of such overlays on touch screens without noticeably affecting the views and/or controls of the touch screens. Some have suggested incorporating complex and expensive mechanisms such as a motorized system to dispose and retract such overlay membrane, but that seems to have significant economic disadvantages and yet to be tested for operability and reliability.

For yet another example, some have suggested placing a rigid keyboard structure over a touch screen and using it to press the touch screen for data entry instead of directly dealing with an emulated on-screen keyboard that can be very small on a hand-held device such as a mobile phone. However, there are issues limiting the benefits and drawbacks hindering actual applications. For instance, a physical keyboard structure may often comprise very small keys as limited by the compact form factor of the device, and such keys are still difficult, unforgiving to touch. Artificially making the keys larger and adding additional supporting structure will likely result in unacceptable bulkiness from a user's perspective. Another unaddressed or under-addressed issue, similar to that in the flexible membrane example, is how to integrate the apparatus with existing touch screen devices in a convenient, user-friendly fashion and without unwanted problems such as noticeably increased form factor and lack of storage solutions. For instance, a user trying a clip-on keyboard structure will likely struggle to find a proper place to store it for reuse. Additionally, emulated keyboard layouts often shift locations or even change orientations on touch screens, making this type of keyboard overlay useless in such situations.

In summary, a user trying to apply these ideas may well encounter new major problems while addressing the original issue. It is also hardly seen any cost-effective, convenient, and universal apparatus that can be adopted by various devices. In addition, it appears that existing touch screen systems are not programmably optimized or streamlined in light of control placement, sequencing, etc. to support better operation of touch screen devices.

Because of such drawbacks and deficiencies associated with current practices and improvement attempts, the mainstream method of operating touch screens today still entails the use of a conventional touch instrument such as a stylus or a human finger to interact with touch commands, resulting in compromised user experiences. Thus, there remain broad needs for practical and optimal solutions that are simple and versatile to adopt, convenient to use, and truly user-friendly from a systemic perspective so that touch screen devices can be easier, more productive, and safer to use.

BRIEF DESCRIPTION OF THE DRAWINGS

Selected embodiments of the invention are disclosed in the detailed description in accordance with the drawings, in which.

DETAILED DESCRIPTION

Figure 1:
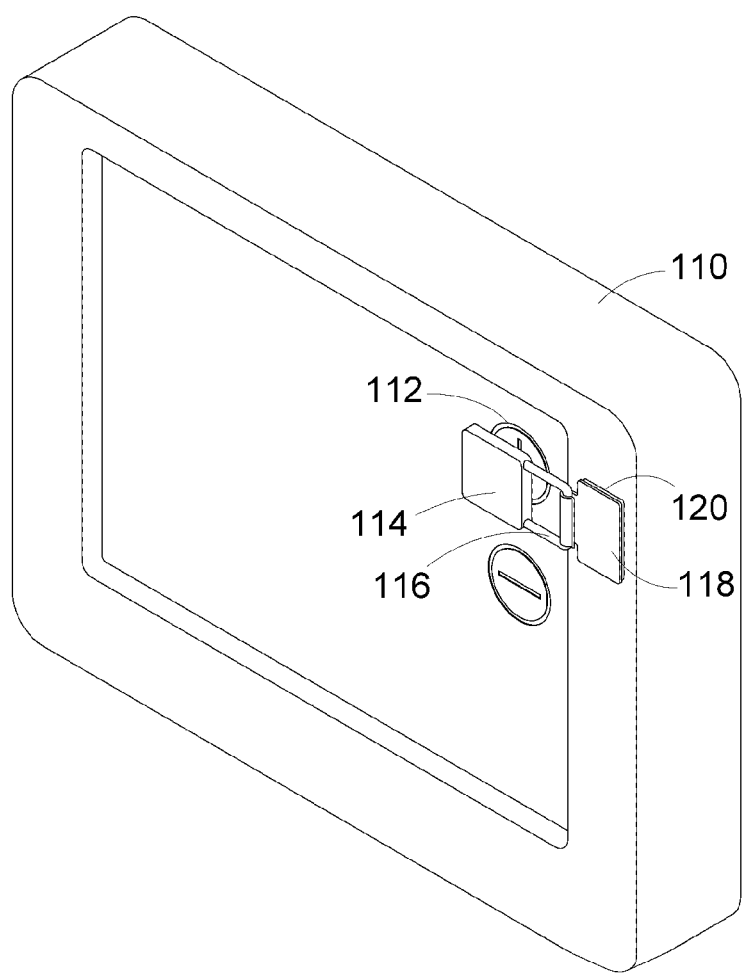
FIG. 1 is a perspective view of a first embodiment in accordance with the invention shown in an engaged position on a touch screen device.
Figure 2:
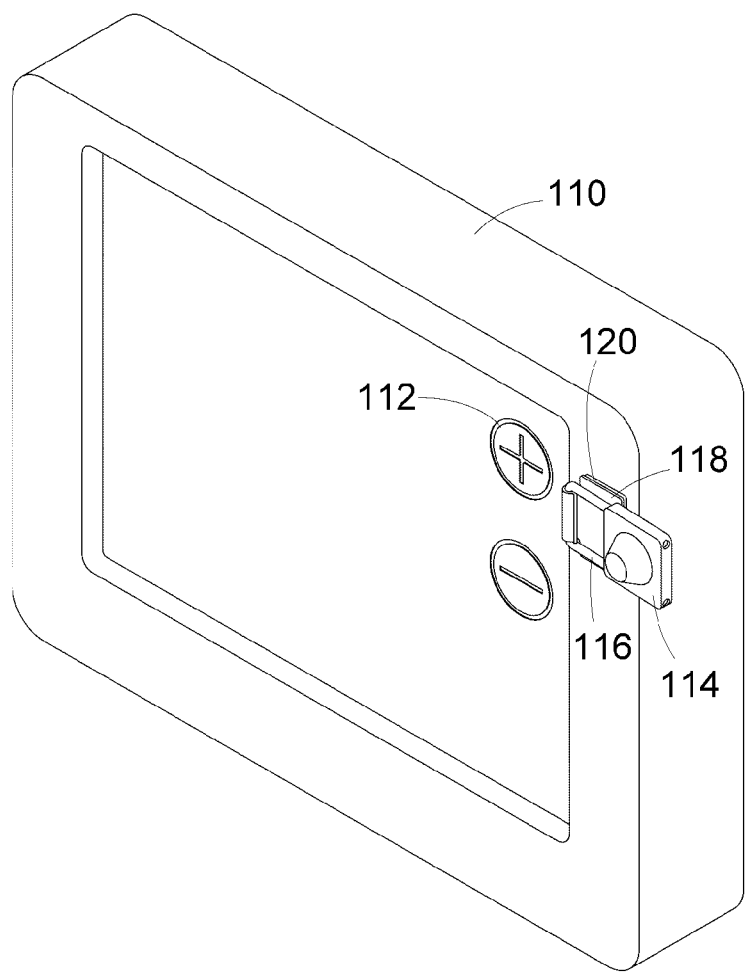
FIG. 2 is a perspective view of the first embodiment shown in a disengaged position on the touch screen device.
Figure 3:
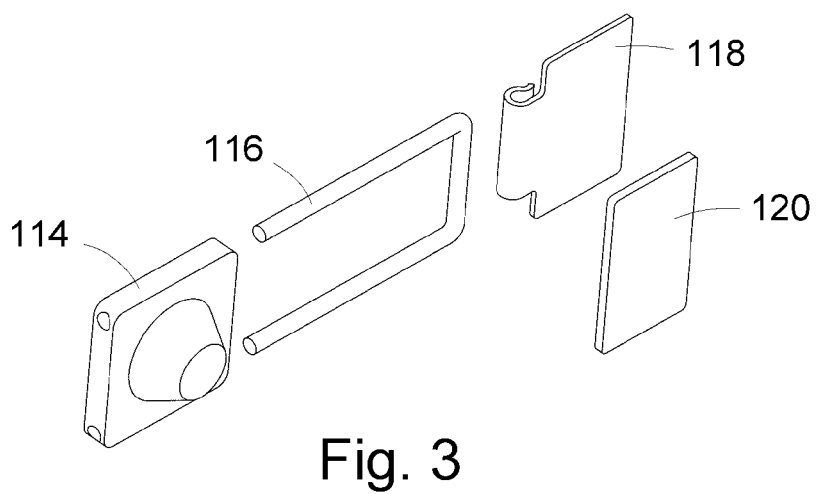
FIG. 3 is an exploded view of the first embodiment.

Referring to the drawings and particularly FIGS. 1-3 initially, a first embodiment comprises a button 114, a retainer 116 in a U-shaped wire form, a hinge bracket 118, and a double-sided tape 120. The button is slidably attached to the retainer from its open end, as more clearly shown in FIG. 3. The retainer is hingedly connected to the hinge portion of the hinge bracket, establishing a hinge assembly. The double-sided tape affixes the hinge bracket to a mounting base, which in this case is the housing of a touch screen device 110. While in an engaged position as illustrated in FIG. 1, button 114 is disposed over and aligned with a touch activation area 112 corresponding to a touch command programmed in the touch screen device.

In this engaged mode, a user can simply uses a touch instrument, such as a stylus or more commonly a finger, to press the button which in turn "touches" the touch activation area underneath and actuate the touch command. The button can be made of transparent materials to allow the user to see what is displayed below it, which makes it practical to construct a button in a conventional but tapered button shape so that it has a small enough tip portion to accurately contact the touch activation area yet naturally an enlarged top portion to contact with the finger for easier operation, even if the top portion extends over other touch activation areas. The retainer with its unique shape has minimum blockage on the touch screen. Whenever needed, the user can move the apparatus out of the touch screen area and restore completely clear and unobstructed access to the entire touch screen by simply rotating the button and the retainer around the hinge assembly to a disengaged position, as shown in FIG. 2.

Installation of this apparatus is straightforward. Two substantially parallel rods of the retainer enter two matching through holes on the button, and the friction between the rods and holes helps retain their relative position. The closed end of the retainer snaps into the hinge portion of the hinge bracket, and the bracket is affixed to one side of the double-sided tape. When the button is aligned with targeted touch activation area on the touch screen, the entire apparatus is affixed to the housing of the touch screen device using the other side of the double-sided tape.

The structure of this embodiment makes it exceptionally easy to retrofit a wide variety of touch screen devices and immediately bring better control interfaces to a user. The hinge assembly can contain a predetermined amount of friction, possibly achieved by making the hinge bracket out of spring sheet metal and the inner diameter of the hinge portion on the hinge bracket slightly smaller than the diameter of the retainer wire, so that the retainer can stay in any position relative to the hinge bracket by itself. This has two important benefits: one is that it eliminates the concern that some factors, such as gravity or vibration, could otherwise cause the retainer to inadvertently rotate to an undesirable position during operation; the other is that it makes the apparatus very versatile in the sense that this single set of apparatus can naturally adapt to various devices having housing surface portions of various slanting angles. For example, this apparatus can be mounted on the front portion of a flat bezel of a touch screen device, and it can be mounted in the same way on another device having a beveled bezel. The button of this apparatus can also reach any location on a touch screen. For example, the retainer of this apparatus can be initially made long enough so that it can reach any point on the touch screen from where the apparatus will be mounted. If the intention is to apply it to a touch activation area that is closer than the maximum reach, the user can slidably adjust the button along the length of the retainer to a proper location. Excessive portions of the retainer can simply be cut off and the possible resulting sharp edges at the cut points can be concealed inside the through holes of the button for a clean, safe, and aesthetic finish. The double-sided tape can be made with a foam body to help adapt to a possibly curved mounting surface. Hinge bracket 118 can of course be shaped to match the approximate contour of the mounting surface for a more secure installation if needed. Combining these features, it is practical to select an initial universal size of the apparatus then user-customize it to fit a wide range of touch screen devices for various touch commands located throughout the touch screens. It is a remarkable advantage to have both versatility and cost-effectiveness as evident in this apparatus.

From a user's perspective, interacting with a touch screen with the aid of such an apparatus is distinctively superior to conventional methods. It gives the user both tactile cues when locating a touch command and natural tactile feedback upon actuation of the touch command. This kind of user-interface experience can be further enhanced by incorporating tactually distinguishable surfaces such as contours, patterns, textures, and different materials such as metal vs. rubber on the buttons. For example, a button with a convex touch surface can be adapted to control a "zoom-in" function of a touch screen device while a button with a concave surface can be used to operate a "zoom-out" function of the device so that it is intuitive for the user to differentiate and operate these different controls by the sense of touch. Furthermore, what also contributes to a better user experience is the fact that a touch screen typically better responds to a physical button than to a human finger as previously explained. A unique advantage of this type of apparatus is its slim, low profile construction with minimal advert impact on the overall form factor of the touch screen device. Another unique advantage is that it is very forgiving to actuate touch commands thanks to the button-retainer construction, which effectively expands the touchable range beyond the button itself so that if the user inadvertently ends up pressing on the retainer, for example, the intended touch command can still be actuated. These significant advantages make a touch screen device easier, safer, more productive, and more fun to use in a variety of circumstances such as driving, gaming, and production.

Figure 4:
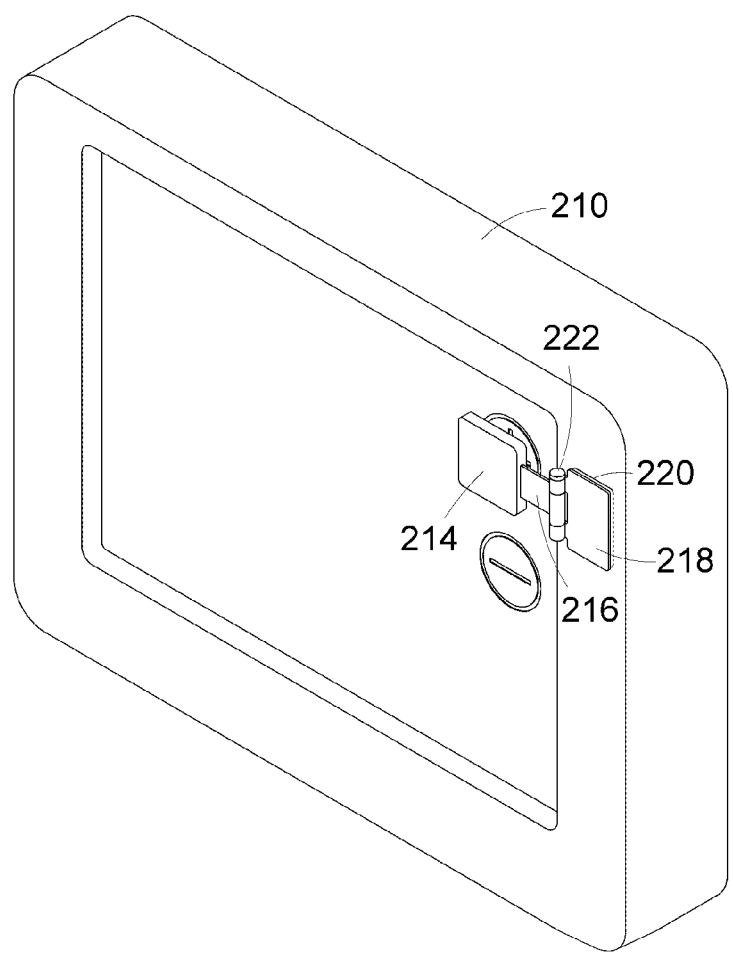
FIG. 4 is a perspective view of a second embodiment in accordance with the invention shown in an engaged position on a touch screen device.
Figure 5:
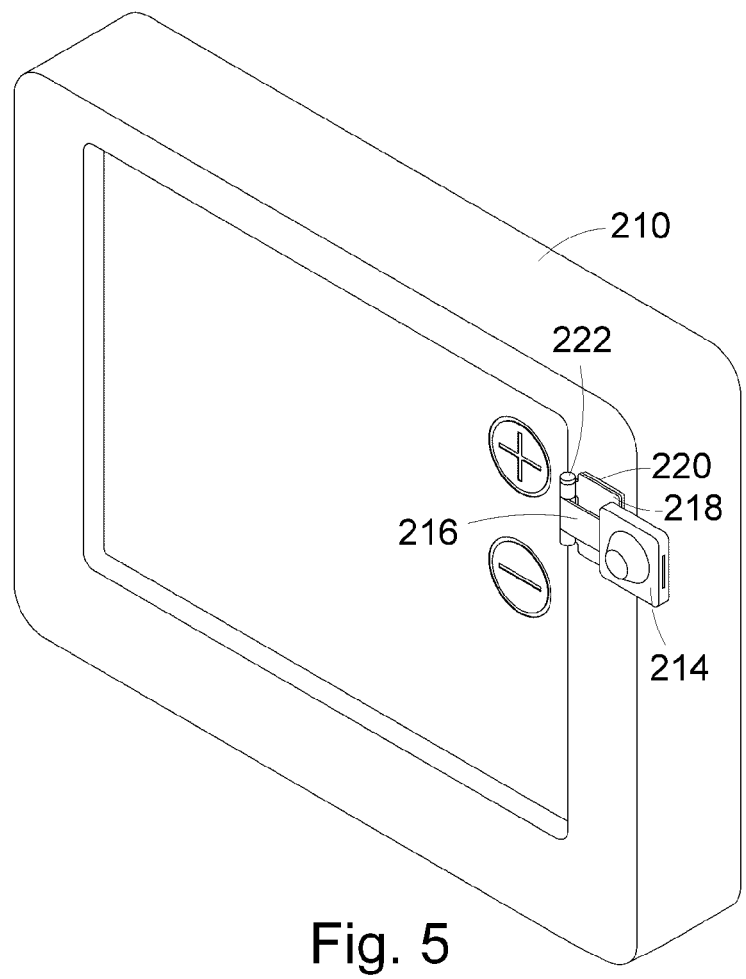
FIG. 5 is a perspective view of the second embodiment shown in a disengaged position on the touch screen device.
Figure 6:
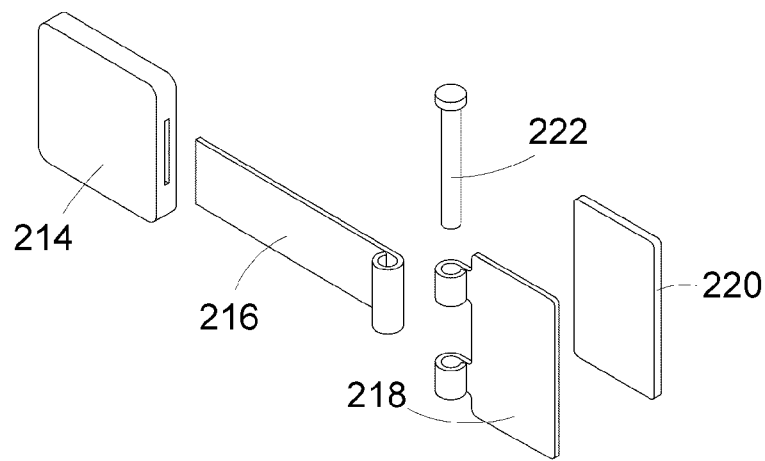
FIG. 6 is an exploded view of the second embodiment.

The remaining drawings are exemplifications of a variety of other forms in accordance with the invention with similar benefits and advantages. FIGS. 4-6 illustrate a second embodiment in which a button 214 having a slot is slidably attached to a retainer 216 having a portion in matching shape and dimensions with the slot. The retainer is hingedly connected to a hinge bracket 218. A hinge pin 222 is used to secure the hinge connection between the retainer and the hinge bracket. Similar to the first embodiment, the hinge bracket is affixed to the housing of a touch screen device 210 by a double-sided tape 220.

Operation of this second embodiment is fundamentally the same as the first embodiment. This apparatus can be easily moved from an engaged position, as shown in FIG. 4, to a disengaged position shown in FIG. 5. Installation and adjustments, with separate components shown in FIG. 6, are comparable to what is illustrated in the first embodiment. For example, the button can be slidably adjusted on the retainer, and the friction between them makes their relative position to each other self-sustainable. The retainer can rotate around the hinge portion of the bracket, and a predetermined amount of friction in the hinge assembly can help the retainer keep its position at any angle to prevent unintended movements and make the apparatus readily installable on surfaces having various slanting angles. One of unique advantages of this embodiment is that it is typically easier to guarantee perfect hinge motions with this type of construction as compared to the first embodiment.

Figure 7:
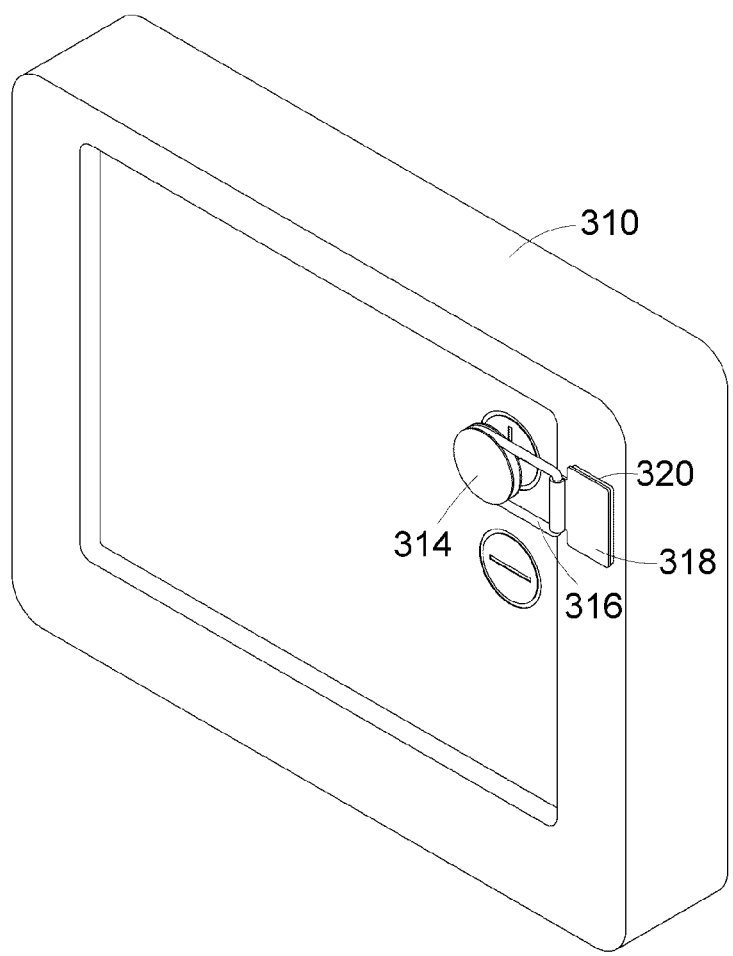
FIG. 7 is a perspective view of a third embodiment in accordance with the invention shown in an engaged position on a touch screen device.
Figure 8:
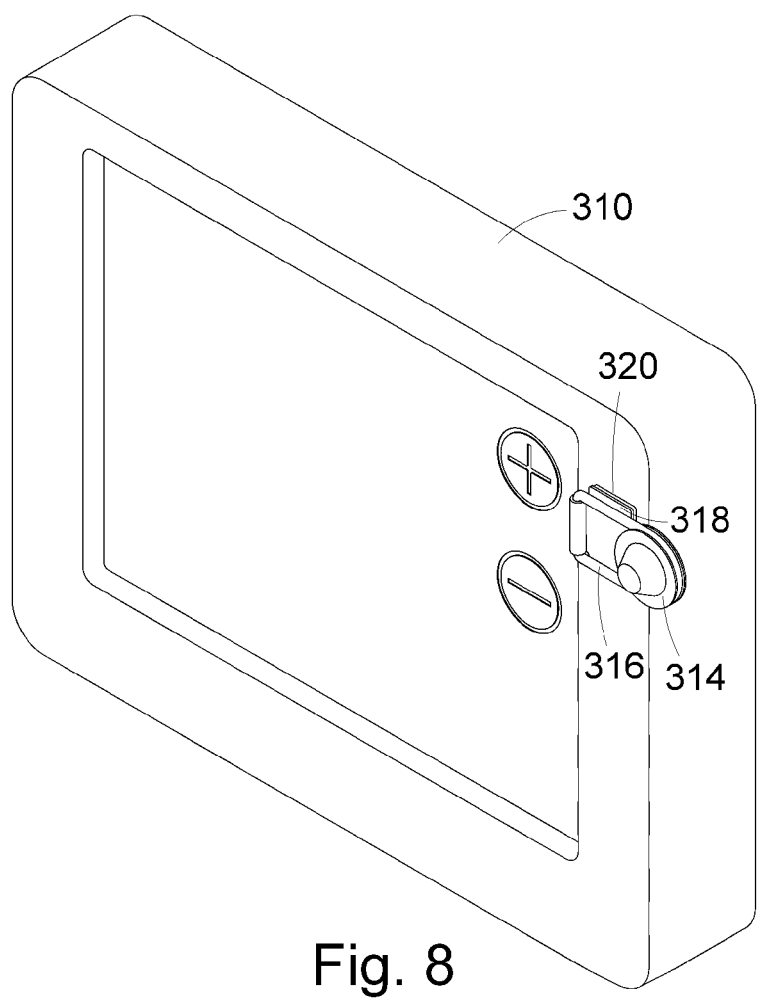
FIG. 8 is a perspective view of the third embodiment shown in a disengaged position on the touch screen device.
Figure 9:
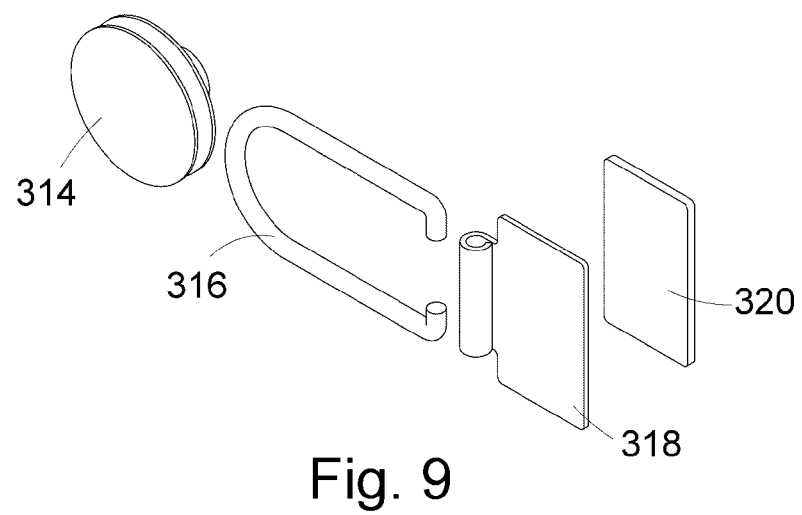
FIG. 9 is an exploded view of the third embodiment.

FIGS. 7-9 illustrate a third embodiment comprising a button 314 attached to a retainer 316 hingedly connected to a hinge bracket 318 affixed to the housing of a touch screen device 310 by a double-sided tape 320. Similar to the first two embodiments, it can quickly convert from an engaged position shown in FIG. 7 to a disengaged position shown in FIG. 8 by rotating the retainer around the hinge portion of the hinge bracket. The retainer is preferably made of elastic wire-shaped materials so that the opening at the end of its hinge portion, as shown in FIG. 9, can expand for easy assembly or disassembly with the hinge bracket. The distance between the inner portions of the parallel retainer wires can be made slightly smaller than the height of the hinge portion of the hinge bracket so that once assembled, the presence of elastic pressure between the retainer and the hinge bracket helps maintain an ideal hinge connection between the two parts and their relative positions. Additionally, an elastic retainer makes it easier to accept the button, which features a grooved portion around its circumference partially wrapped with the retainer at its closed end having compatible shape and dimensions.

Figure 10:
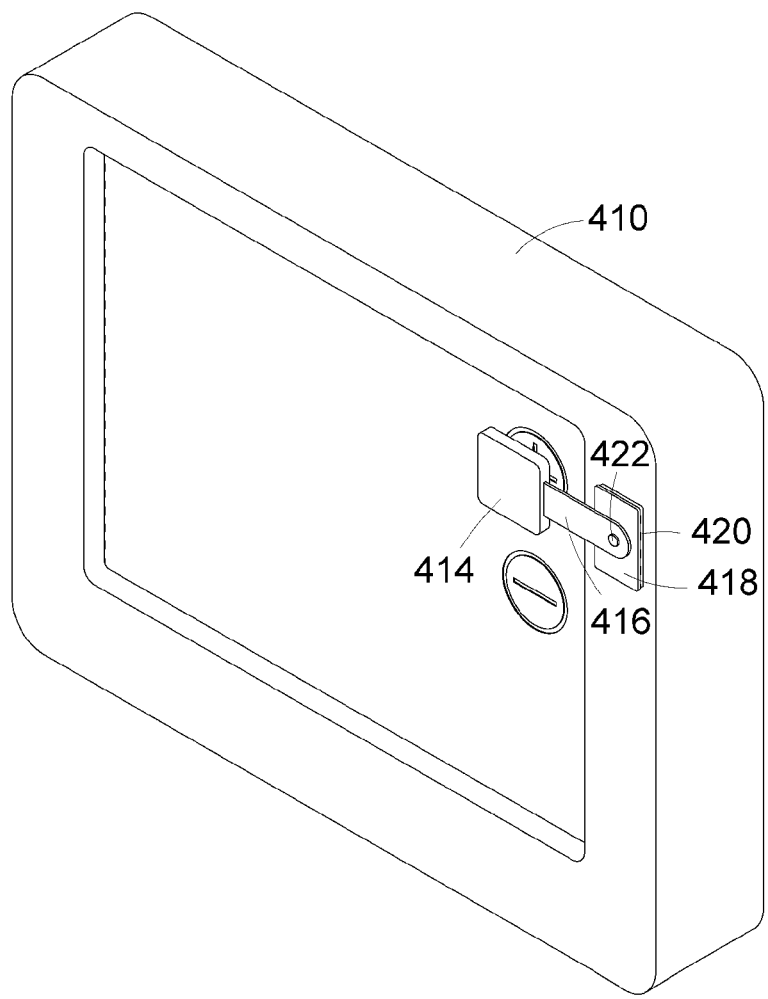
FIG. 10 is a perspective view of a fourth embodiment in accordance with the invention shown in an engaged position on a touch screen device.
Figure 11:
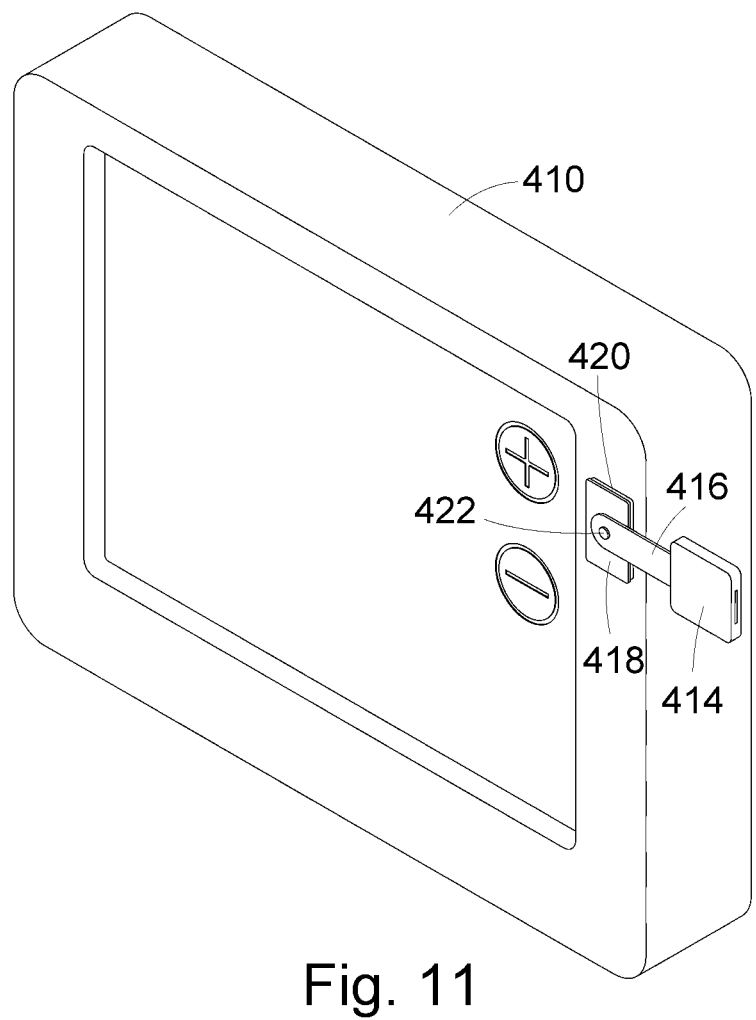
FIG. 11 is a perspective view of the fourth embodiment shown in a disengaged position on the touch screen device.
Figure 12:
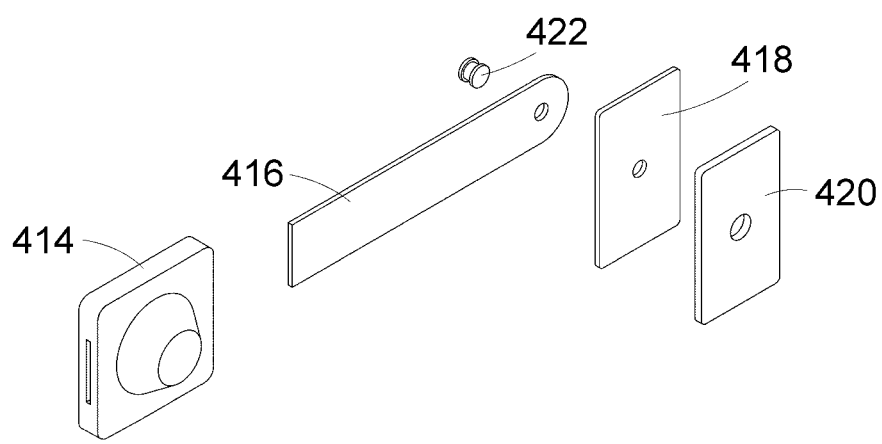
FIG. 12 is an exploded view of the fourth embodiment.

FIGS. 10-12 illustrate a fourth embodiment in which a button 414 having a slot is slidably attached to a retainer 416 pivotally connected to a pivot bracket 418 by a pivot pin 422. A double-sided tape 420 affixes the pivot bracket to the housing of a touch screen device 410. In this embodiment, the retainer can rotate around the pivot pin in relation to the pivot bracket, allowing the switch between an engaged position shown in FIG. 10 and a disengaged position shown in FIG. 11. The assembly can be better construed with separately illustrated components in FIG. 12. It is worth pointing out that while pivoting the retainer from the engaged position to the disengaged position and vice versa, the tip of the button could be in contact or even seemingly in interference with the housing depending on the height of the button tip. This should not, however, pose a real problem as the retainer can be made of flexible materials, allowing the retainer to bend and lift the button over the housing along its path of movement.

Figure 13:
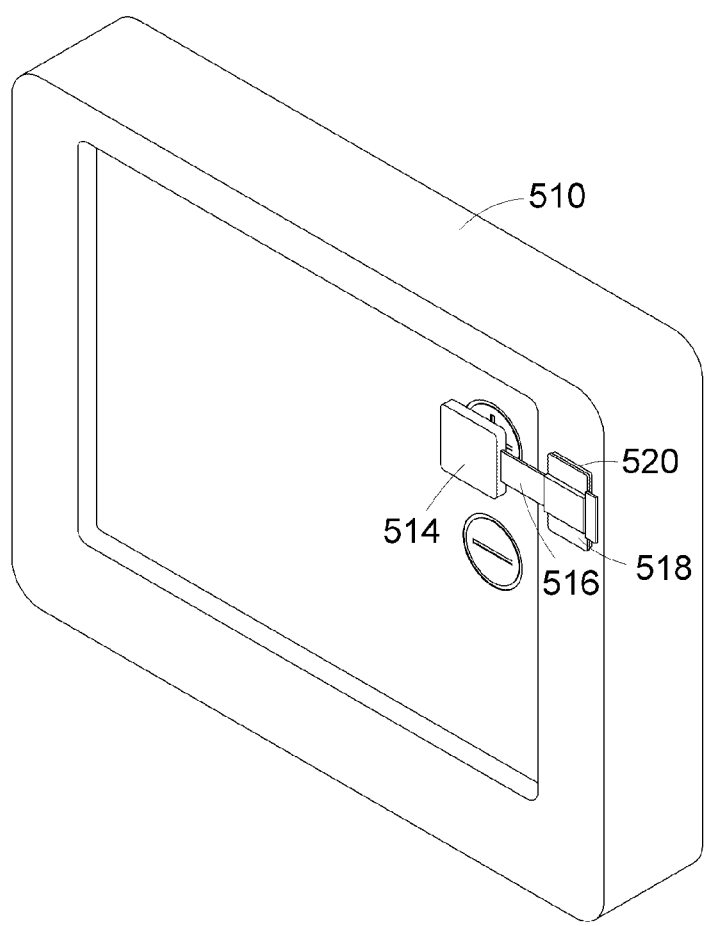
FIG. 13 is a perspective view of a fifth embodiment in accordance with the invention shown in an engaged position on a touch screen device.
Figure 14:
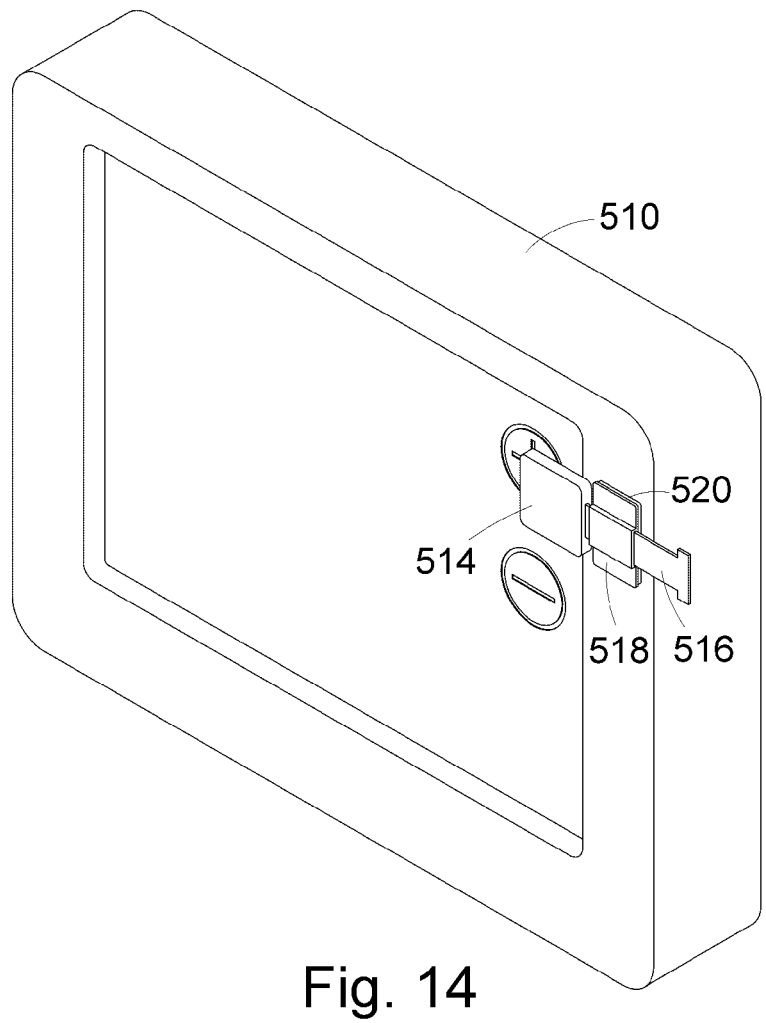
FIG. 14 is a perspective view of the fifth embodiment shown in a disengaged position on the touch screen device.
Figure 15:
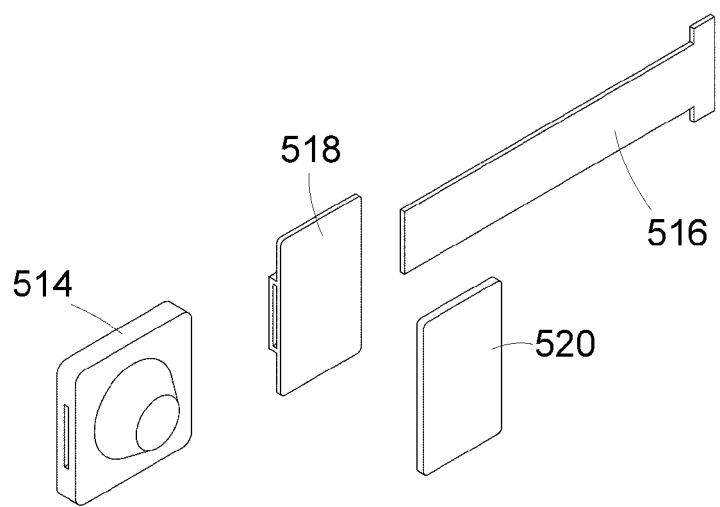
FIG. 15 is an exploded view of the fifth embodiment.

FIGS. 13-15 illustrate a fifth embodiment comprising a button 514 having a slot slidably attached to a retainer 516 which is further slidably attached to a slide bracket 518 affixed to the housing of a touch screen device 510 by a double-sided tape 520. The retainer slides along a second slot featured on the slide bracket to switch the apparatus from an engaged position shown in FIG. 13 to a disengaged position shown in FIG. 14, where the button rests along the inner edge of the housing. FIG. 15 more clearly shows how these components are connected.

Figure 19:
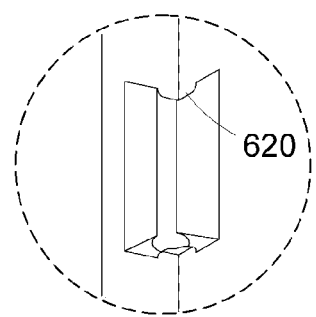
FIG. 19 is an enlarged view corresponding to reference number 19 in FIG. 18.

FIGS. 16-19 illustrate a sixth embodiment further exploiting the advantages and benefits recited so far by integrating the apparatus with the housing of a touch screen device 610. It is realized by mounting a retainer 616 directly on the housing, eliminating the need for a bracket and a double-sided tape used in previous embodiments. The components of this embodiment, best shown in FIG. 18, include a button 614 mountable to retainer 616 which is in turn mountable to a recess 618 formed on the housing. Similar to the third embodiment illustrated earlier, the button can have a grooved portion around it circumference fitted for the shape and dimensions of the circular portion of the retainer for a more secure attachment. Both the retainer and the button can be made of elastic materials to further simplify their assembly. The retainer at its open end features two axially aligned cylindrical tips that will enter two corresponding holes formed on the top and bottom surfaces of the recess on the housing, preferably with a slight amount of expanding pressure on the surfaces for a perfect hinge connection. The elastic properties of the retainer make such hinge attachment or detachment a very easy task. As illustrated in FIG. 19, furthermore, the surfaces of the recess can have contoured protrusions so that the retainer is biased toward predetermined rest locations for better user experience. This is reflected in FIG. 16 and FIG. 17 in which the apparatus stays reliably in an engaged position and a disengaged position respectively.

Figure 16:
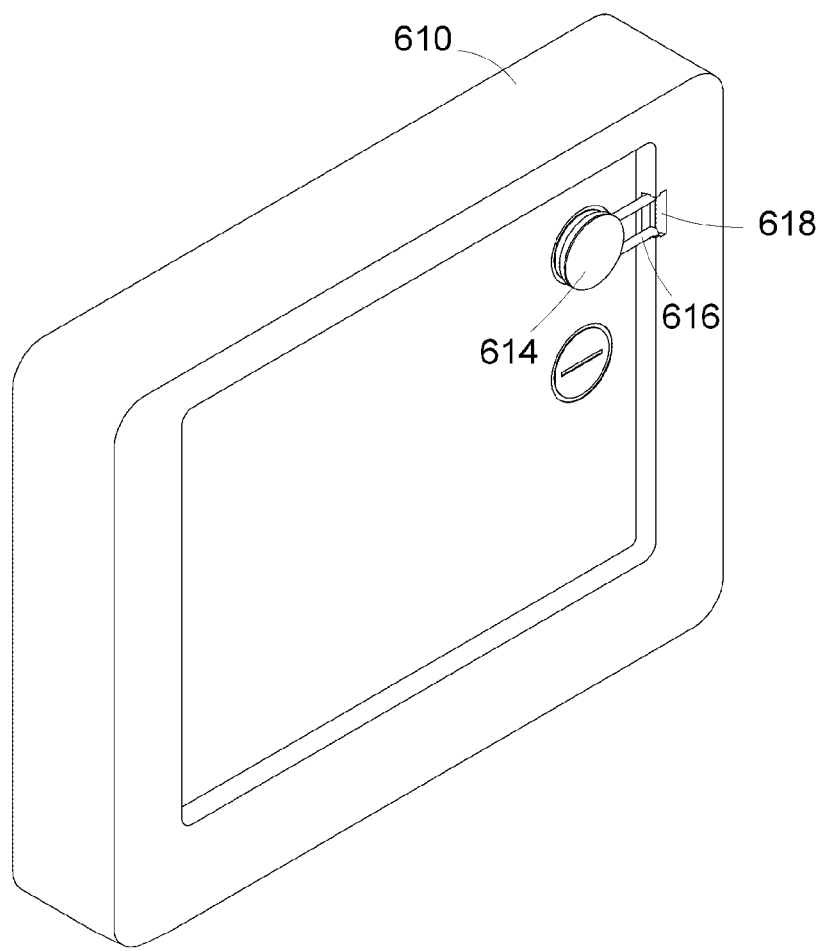
FIG. 16 is a perspective view of a sixth embodiment in accordance with the invention shown in an engaged position on a touch screen device.
Figure 17:
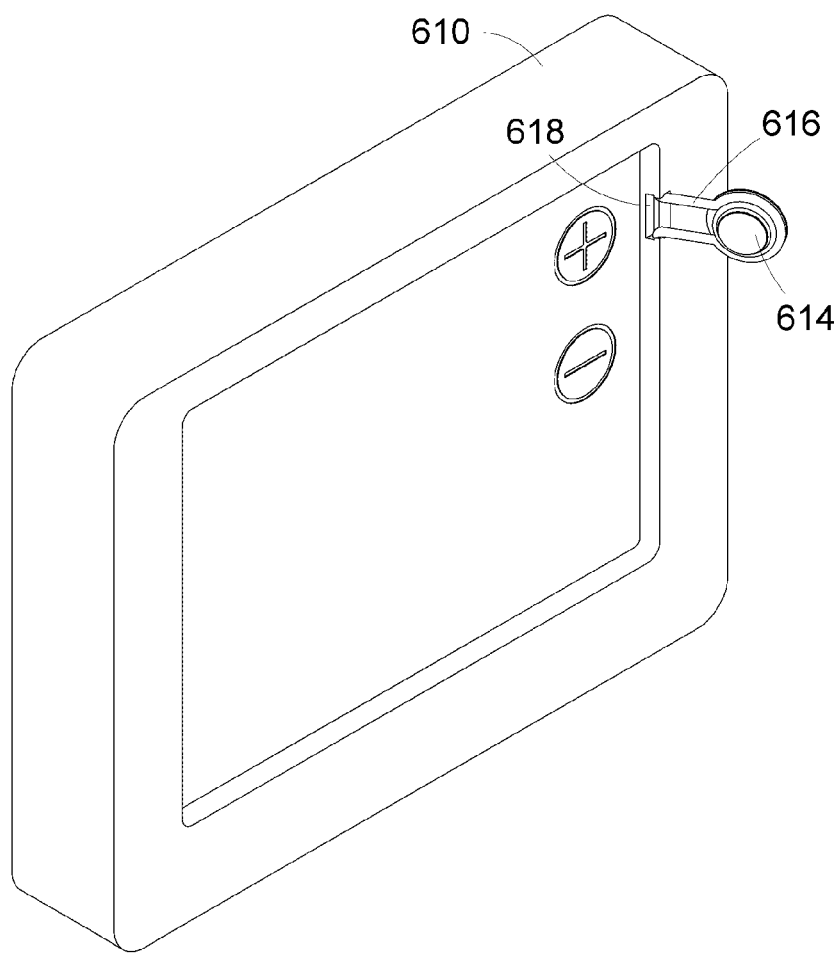
FIG. 17 is a perspective view of the sixth embodiment shown in a disengaged position on the touch screen device.
Figure 18:
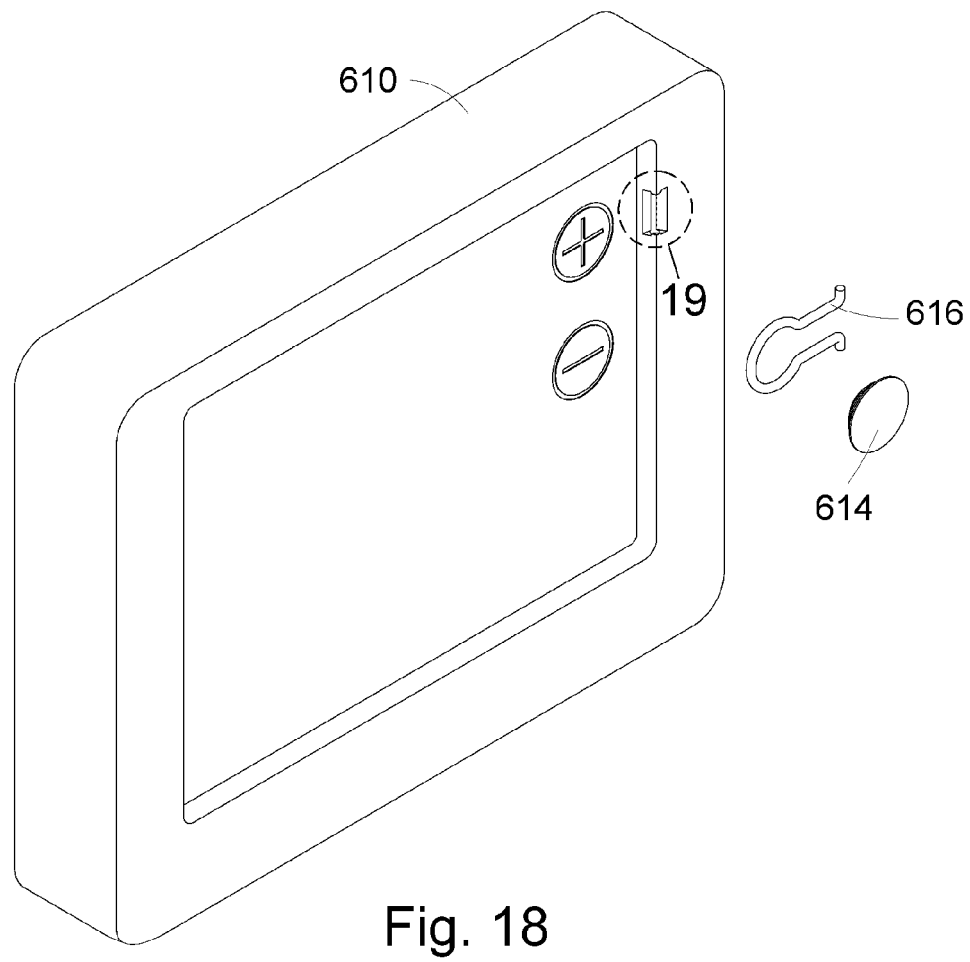
FIG. 18 is an exploded view of the sixth embodiment.

This type of built-in mounting option can be easily and cost-effectively adopted by an original equipment manufacturer (OEM) during design and manufacturing of the touch screen housing, and it can be replicated around the housing to readily deploy multiple apparatus for multiple enhanced controls of the touch screen device. A user then can attach or detach any available number of these apparatus as desired, and it is extremely easy to do so at any time. This option eliminates the extra components and steps that the user would need to potentially customize, align, and install as seen in previous examples. Besides exceptionally easy installation, precision and robustness are also guaranteed with this option as the variability from retrofitting is eliminated. What's more, the apparatus can stay below the front surface of the housing in the engaged position, as shown in FIG. 16, so that it has no impact on the form factor of the touch screen device.

Figure 20:
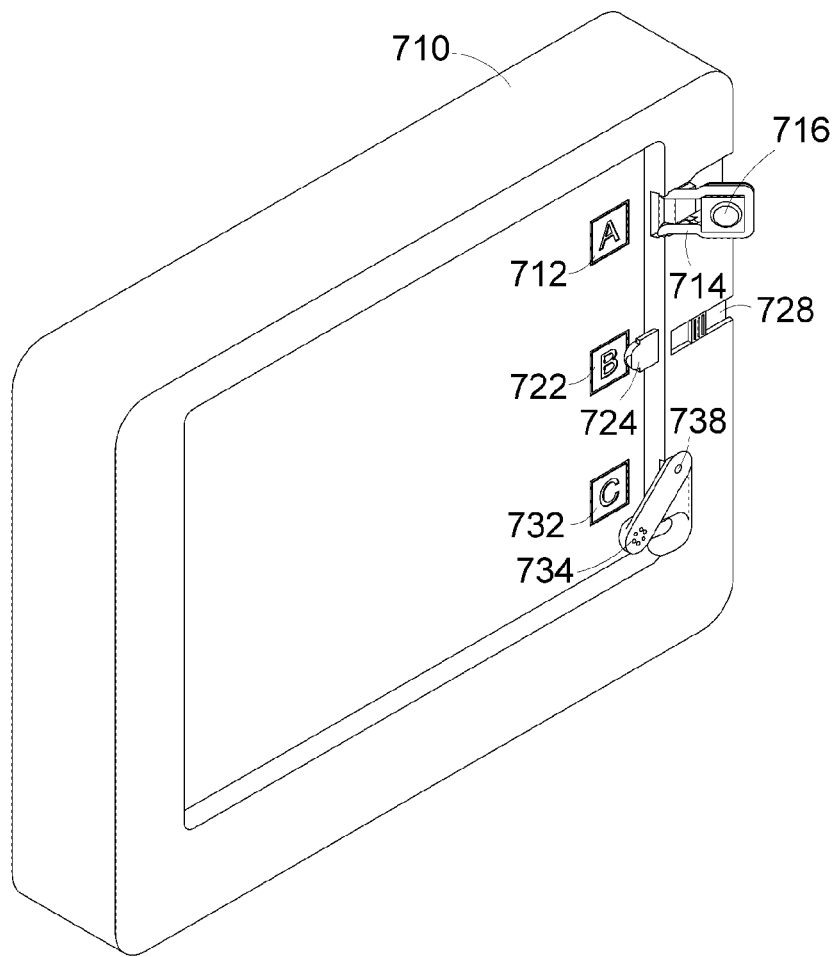
FIG. 20 is a perspective view of a seventh embodiment in accordance with the invention shown in a partially engaged position on a touch screen device.
Figure 21:
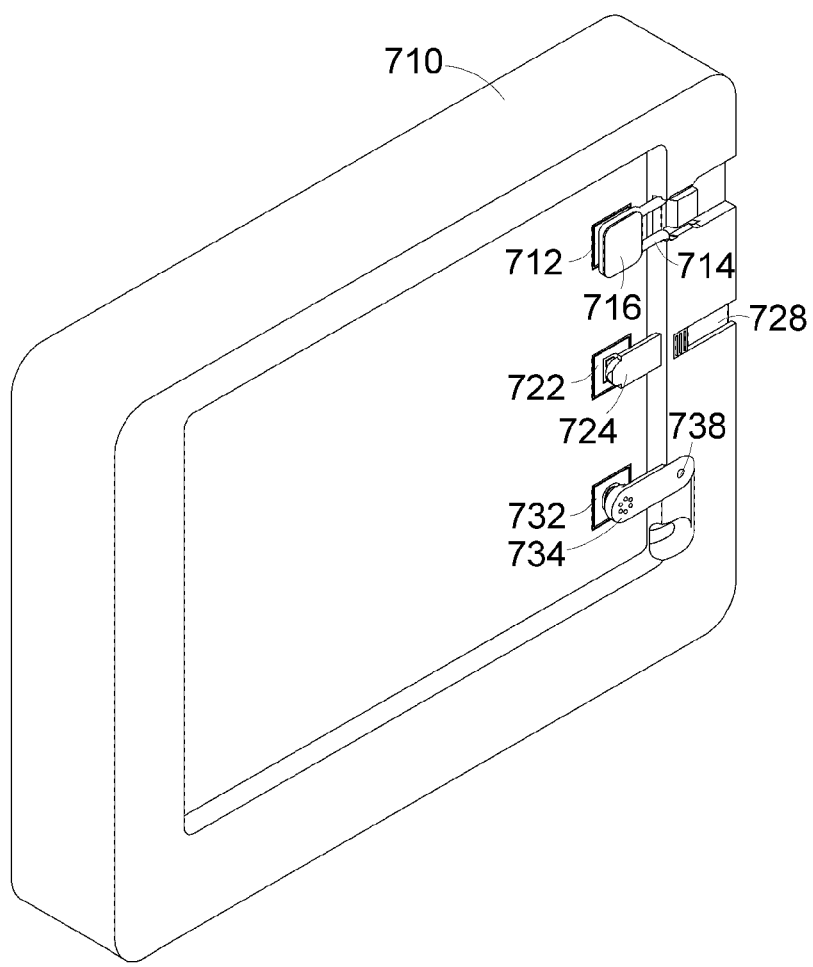
FIG. 21 is a perspective view of the seventh embodiment in accordance with the invention shown in a fully engaged position on the touch screen device.
Figure 22:
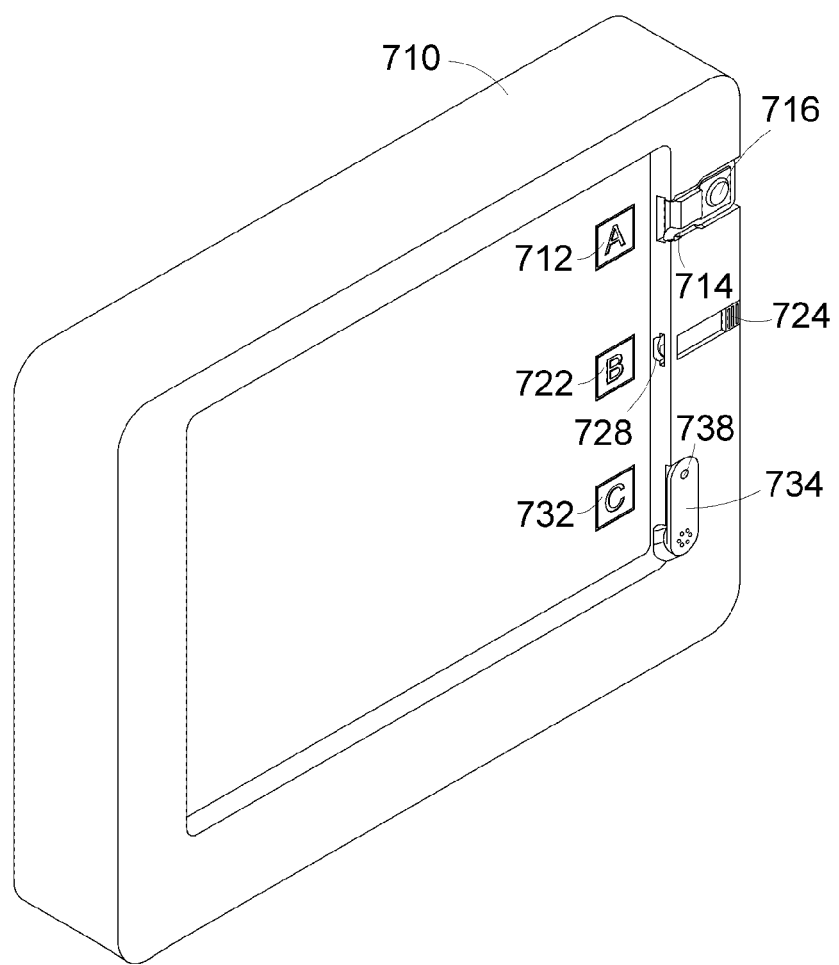
FIG. 22 is a perspective view of the seventh embodiment in accordance with the invention shown in a disengaged and storage position on the touch screen device.

As far as impact on form factor is concerned, all embodiments illustrated so far can be easily revised into some types of concealable forms so that they have virtually no negative effects at all on the form factor of a touch screen device. In a seventh embodiment illustrated in FIGS. 20-22, a touch screen device 710 employs three apparatus using movable connections previously recited. First apparatus, as shown in FIG. 20, comprises a button 716 mounted on a retainer 714 which is further attached to a recessed area on the housing of the touch screen device by a hinge connection similar to that illustrated in the sixth embodiment. This apparatus is adapted to contact a first touch activation area 712 on the touch screen. A second apparatus comprises an integrated retainer-button 724 slidably attached to a channel 728 formed on the housing, and it is adapted to contact a second touch activation area 722. A third apparatus comprises a second integrated retainer-button 734 pivotally attached to a recessed area on the housing by a pivot pin 738 and adapted to contact a third touch activation area 732. FIG. 21 and FIG. 22 further illustrate these apparatus in their engaged positions and disengaged positions respectively. These apparatus not only can stay submerged relative to the profile plane formed by the front portions of the housing in their engaged positions but also remain completely concealed within the form factor of the touch screen device in their disengaged positions with those formed recesses on the housing. Small form factor and sleekness of a device have been increasingly emphasized and demanded by consumers in today's extremely competitive touch screen device market, and this is yet another example of unique advantages of these apparatus.

All examples illustrated so far are apparatus coupled with the housings of touch screen devices. It should not, however, be construed as a limiting factor or that mounting these apparatus on such surfaces is preferred. In the following continued illustrations, embodiments are chosen to demonstrate just how easy and suitable it is to couple similar apparatus with the cases of touch screen devices so that consumers can have an entirely new perspective of opportunities to benefit from these apparatus with similar unique advantages such as simplicity and concealability yet without dependency on OEM designs.

Figure 23:
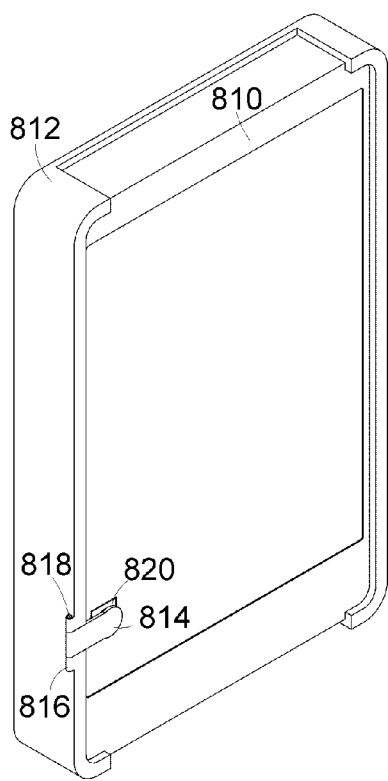
FIG. 23 is a perspective view of an eighth embodiment in accordance with the invention shown in an engaged position on a touch screen device.
Figure 24:
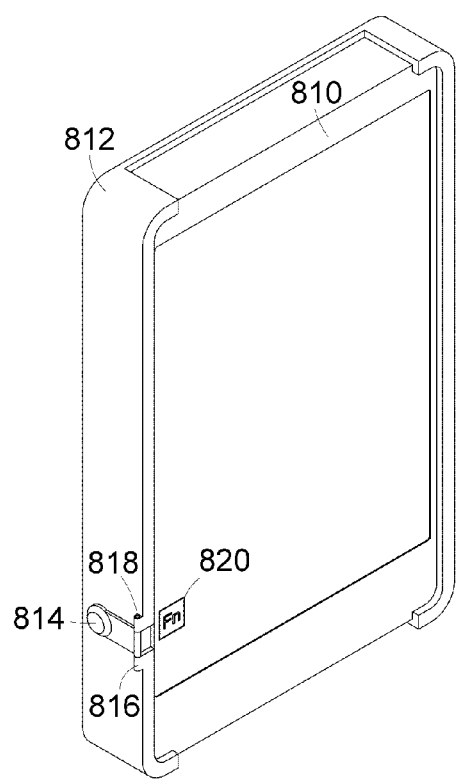
FIG. 24 is a perspective view of the eighth embodiment in accordance with the invention shown in a disengaged position on the touch screen device.

FIG. 23 shows an eighth embodiment in accordance with the invention involving a case 812 for a touch screen device 810. In this example, an integrated retainer-button 814 is attached to a hinge 816 formed on the outer surface of the case. A hinge pin 818 secures the hinge assembly so that the integrated retainer-button is properly aligned with a touch activation area 820 in an engaged position as shown. The hinge assembly is placed approximately where the front touch screen surface and the side of the case intersect so that the integrated retainer-button can stay close to the profile of the overall device in this engaged position and in a disengaged position, which is illustrated in FIG. 24.

Sometimes a user may find it necessary to use a fairly long retainer to dispose a button over a touch activation area when such an area is located more toward the center of a touch screen or the touch screen is of a large size. This may present an issue that, when the button and the retainer are moved from an engaged position to a disengaged position for storage, the length of the retainer may exceed the size limit of the surface it rests on. Using previous embodiment as an example, if the length of the integrated retainer-button were twice as long, it would extend well beyond the profile of the case in the disengaged mode shown in FIG. 24. This issue can be resolved by applying a variety of mechanisms as exemplified in the next several illustrations.

Figure 25:
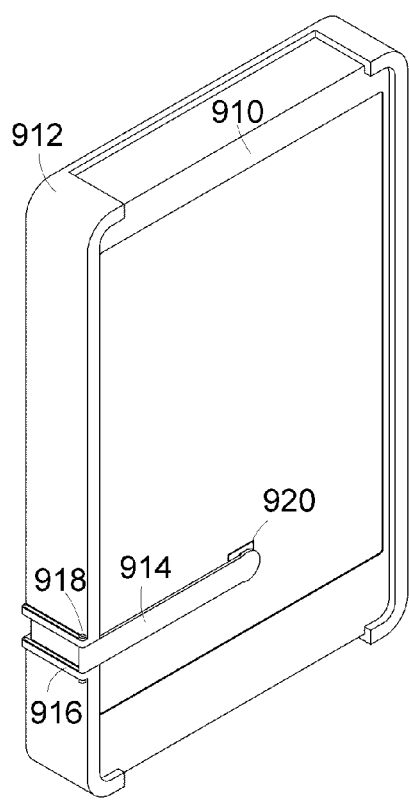
FIG. 25 is a perspective view of a ninth embodiment in accordance with the invention shown in an engaged position on a touch screen device.
Figure 26:
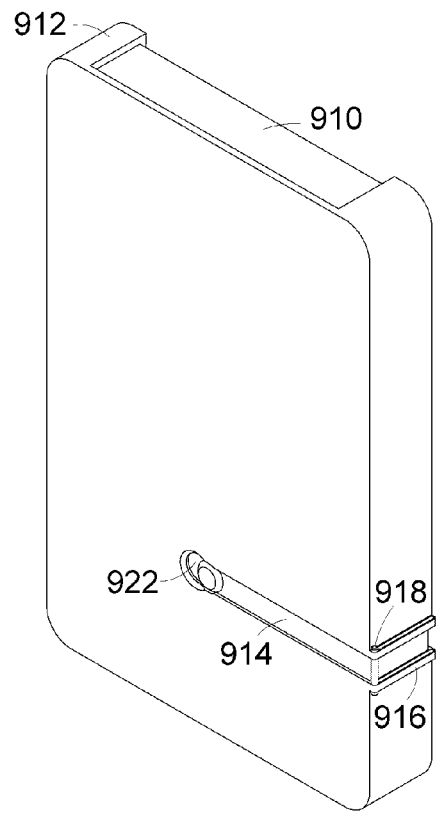
FIG. 26 is a perspective view of the ninth embodiment in accordance with the invention shown in a disengaged position on the touch screen device.

FIGS. 25-26 show a ninth embodiment using a combined hinge and slide assembly to dispose an integrated retainer-button 914 of excessive length around the form factor of a case 912 and a touch screen device 910. In an engaged position as shown in FIG. 25, the button portion of the integrated retainer-button is in alignment with a touch activation area 920 on the touch screen. To minimize form factor impact, the top surface of the integrated retainer-button can stay flush with the front plane of the case by cutting a notch on the case to receive the matching portion of the integrated retainer-button. A hinge hole is formed at one end of the integrated retainer-button to establish a hinge assembly with a pair of parallel slots 916, which is formed on the side of the case, by a hinge pin 918. To switch to a disengaged position as shown in FIG. 26, the integrated retainer-button rotates around the axis defined by the hinge pin and meanwhile the hinge pin slides along the pair of parallel slots from one end to the other, allowing the integrated retainer-button to continue to rotate and settle in a recess formed on the back of the case. The pair of parallel slots in this example have been rendered above the side of the case for simplicity and clarity of the illustration, but it is easy to make them partially or completely beneath the side of the case by forming corresponding recesses to further reduce the overall form factor. These considerations can be incorporated as needed to all other applicable examples illustrated throughout this disclosure.

Figure 27:
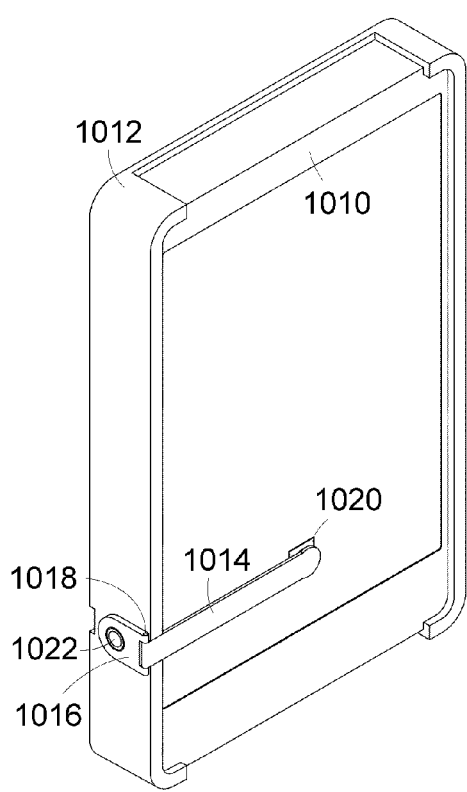
FIG. 27 is a perspective view of a tenth embodiment in accordance with the invention shown in an engaged position on a touch screen device.
Figure 28:
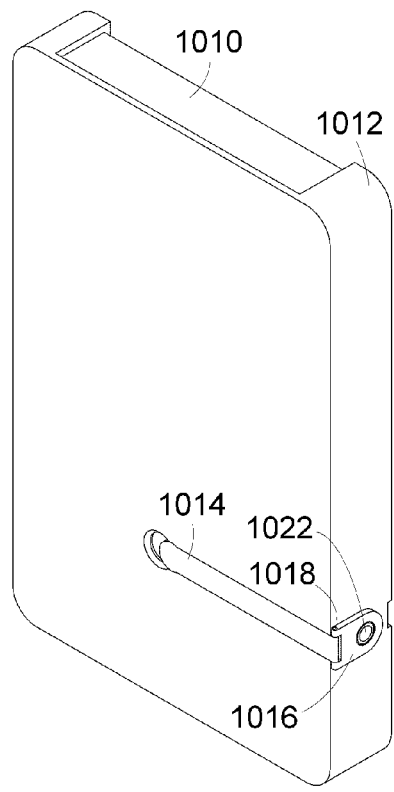
FIG. 28 is a perspective view of the tenth embodiment in accordance with the invention shown in a disengaged position on the touch screen device.

A tenth embodiment depicted in FIGS. 27-28 shows another mechanism to adapt an apparatus having long components. In this example, a combined hinge and pivot assembly is used. Referring to FIG. 27, the button portion of an integrated retainer-button 1014 is aligned with a touch activation area 1020 of a touch screen device 1010 in this engaged position. The integrated retainer-button has a hinge hole formed on one end so that it is hingedly attached to a hinge-pivot bracket 1016 by a hinge pin 1018. To transit from this engaged position to a disengaged position shown in FIG. 28, a user first rotates the integrated retainer-button around the axis defined by the hinge pin then pivots it along with the hinge-pivot bracket around a pivot pin 1022 which pivotally connects the hinge-pivot bracket to the side of a case 1012. Once the hinge-pivot bracket is turned 180 degrees, the integrated retainer-button can rotate toward the back of the case and completely settle in a recess formed there.

Figure 29:
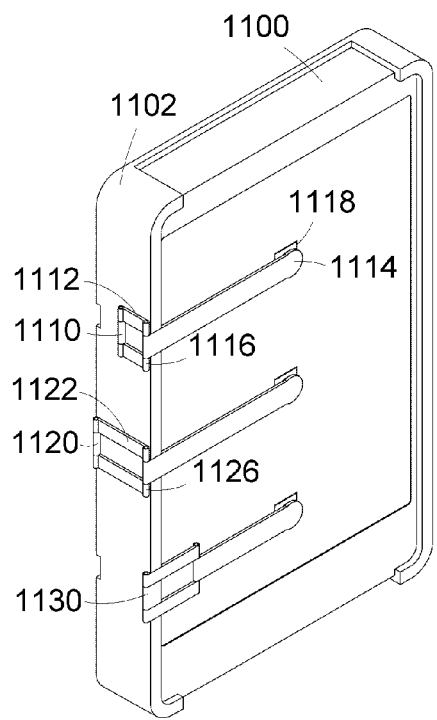
FIG. 29 is a perspective view of an eleventh embodiment in accordance with the invention shown in an engaged position on a touch screen device.
Figure 30:
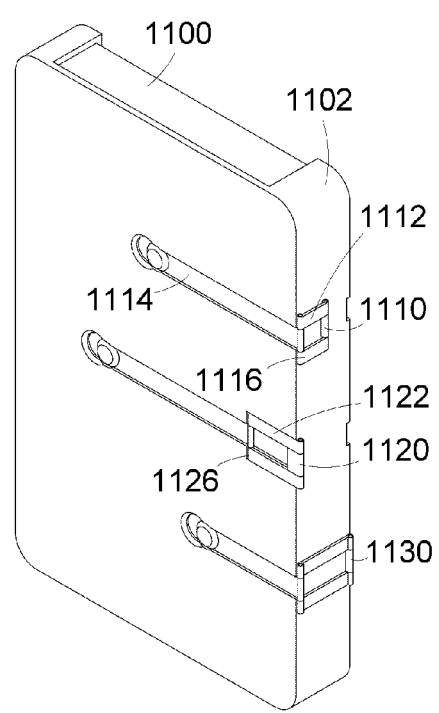
FIG. 30 is a perspective view of the eleventh embodiment in accordance with the invention shown in a disengaged position on the touch screen device.

Yet another type of mechanism can be used to achieve similar results. In this eleventh embodiment illustrated in FIGS. 29-30, three variations of a double-hinge assembly are adapted for apparatus having long components. The first variation has an integrated retainer-button 1114 disposed over a touch activation area 1118 of a touch screen device 1100 in an engaged position as shown in FIG. 29. The integrated retainer-button has a hole on one end connected to a first hinge portion of a first hinge-hinge bracket 1112, forming a mobile hinge assembly 1116. A second hinge portion on the first hinge-hinge bracket is connected to a hinge 1110 formed on the side of a case 1102, establishing an anchored hinge assembly. The location of hinge 1110 is approximately half way of the thickness of the case, and the distance between the mobile hinge assembly and the anchored hinge assembly is also approximately half of the thickness of the case so that the mobile hinge assembly will rest around the corner of the side of the case and the touch screen to allow a tight wrap-around of the apparatus in this engaged position. Similarly, when the apparatus is moved to a disengaged position as shown in FIG. 30, the mobile hinge will rest around the opposite corner formed by the side and the back of the case so that the apparatus wraps around the case snugly and conceals in a recess formed on the back of the case in this disengage position to achieve minimum impact on the form factor of the overall device in both positions.

The second variation works in a similar manner. The main difference is that the length of a second hinge-hinge bracket 1122, as measured from a second mobile hinge assembly 1126 to a second anchored hinge assembly 1120, is approximate twice as much as that of the first variation. Consistently, the anchored hinge assembly is disposed around the edge between the side and the back of the case so that the apparatus can properly and tightly move around the profile of the case and achieve equivalent results in both engaged and disengaged positions as illustrated in the first variation.

The third variation is almost the same as the second variation except that a third anchored hinge assembly 1130 is placed around the edge formed by the front touch screen surface and the side of the case. Similar to some previous embodiments, friction and movement regulation features can be incorporated into these hinge assemblies, retainer-recess couplings, and similar situations to help maintain desirable connection properties and keep their relative movements within predetermined ranges. These can be easily realized by adopting similar features illustrated previously or conventional mechanisms such as snaps, movement stoppers etc., and they can be applied to all other applicable embodiments as well.

Figure 31:
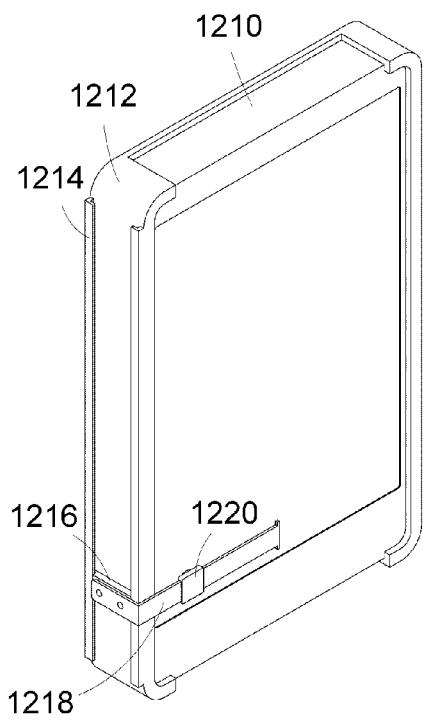
FIG. 31 is a perspective view of a twelfth embodiment in accordance with the invention shown in an engaged position on a touch screen device.
Figure 32:
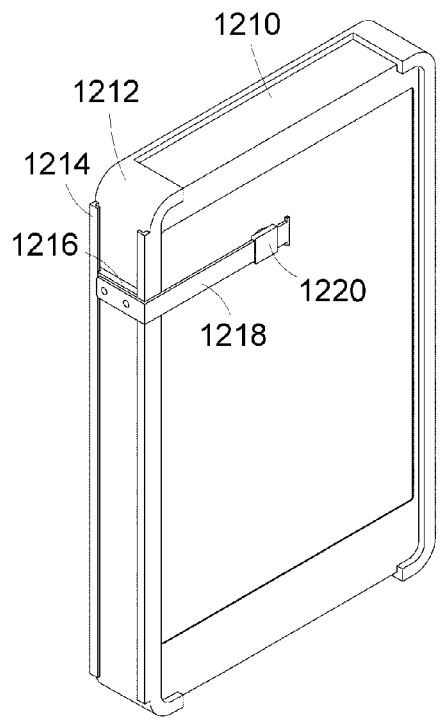
FIG. 32 is a perspective view of the twelfth embodiment in accordance with the invention shown in a disengaged position on the touch screen device.

In certain situations a user may desire a "one-size-fits-all" solution and want a single apparatus to be able to reach a given touch activation area that may change from time to time. One example is a touch screen mobile phone capable of running various video game applications, and the user wants to enjoy the greatly enhanced control experience with the aid of an apparatus based on this invention. While one game may arrange controls in certain predetermined touch activation areas on the touch screen, another game may place them in completely different locations so that a typical single apparatus may not accommodate both game plays. This issue can be resolved with an apparatus similar to a twelfth embodiment in accordance with the invention. As illustrated in FIGS. 31-32, an apparatus for a touch screen device 1210 comprises a button 1220 slidably attached to a first section of an L-shaped retainer 1218. A second section of the L-shaped retainer, which is approximately perpendicular to the first section, is affixed to a slide member 1216 that can slide along a channel 1214 formed on the side of a case 1212. The first section of the L-shaped retainer can be made long enough so that the button can travel along it and cover the entire width of the touch screen. The channel can also be made long enough so that the slide member, coupled with the button, can travel along it and cover the entire height of the touch screen. The combination of these movements allows the button to reach any given touch activation area on the touch screen, as exemplified in FIG. 31 and FIG. 32 respectively.

In this embodiment, a fixed L-shaped retainer is used for the illustration. Other features can of course be incorporated to yield additional desirable benefits. For example, this embodiment can take advantage of numerous examples previously illustrated to make the apparatus concealable within the form factor of the overall device in both engaged mode and a disengage mode for on-the-device storage. Another consideration is to make the retainer retractable or collapsible as seen in many conventional assemblies such as retractable antennas, retractable arms, and articulating arms that employ one or more of a telescopic assembly, a hinge assembly, or a combination of them. This can make the apparatus very compact and more aesthetically appealing. For simplicity reasons, such retractable, collapsible, and articulating mechanisms are collectively referred to as retractable as used in the claims.

Discussions so far have been oriented around how various apparatus can be adapted to enhance the touch screen action.

The overall user experience can be further improved by optimizing and streamlining control designs for touch screen devices from a systemic perspective. Touch controls of a touch screen device typically comprise a plurality of touch commands and display pages. Once a touch command is actuated, a new display page is activated with customized information and new arrangement of touch commands. A user then actuates the next intended command to proceed, and likely this next intended command is designated by a different touch activation area than that for the previous command so that the user will have to move and realign the touch instrument in accordance with the location change. This may not pose a significant shortcoming when a conventional touch instrument, often a finger, is used to directly interact with the touch screen because the uniform screen does not provide the user with any tactile cues and feedback as it would by using an apparatus discussed in this disclosure. Once the user adopts one of such apparatus to operate a touch screen device, however, it becomes substantially advantageous when touch commands from adjacent display pages, are effectively aligned so that the same apparatus can be used to actuate these touch commands consecutively. Because the apparatus provides the user with clear tactile cues and feedback, it is practical for the user to rest a finger on the apparatus and confidently control a series of streamlined touch commands in a highly efficient manner. This will also reduce the number of apparatus required to control the most frequently used functions and simplify the entire system.

One embodiment based on this principle can be a touch screen GPS unit comprising an apparatus as discussed in this disclosure, a first touch activation area corresponding to a first command for "display trip info", and a second touch activation area corresponding to a second command displayed on a second display page for "go back". The apparatus is disposed over the first touch activation area and can actuate the first command accordingly. The second touch activation area is arranged substantially close to, overlapping or not, the first touch activation area so that the apparatus can effectively actuate the second command as well. Actuating the first command will activate the second display page showing the second command, and actuating the second command will activate a previous display page, which in this case is the page displaying the first command. A user now can first place a finger around the button portion of the apparatus with ease, thanks to the tactile aid, and then press once to access the trip information as implied by the first command "display trip info". Without having to realign the finger, the user can confidently press the apparatus a second time to return to the previous page as implied by the second command "go back".

If it is somehow not decided to architect such consecutive touch commands in an aligned manner, it would still be clearly advantageous to align touch commands from multiple display pages in a non-consecutive manner so that they can be actuated by the same apparatus whenever it becomes applicable. One concrete example reflecting this would be a touch screen GPS unit having an apparatus, as discussed in this disclosure, disposed over a touch command "back to driving mode" for always returning to main diving map display. The touch activation area for this command can be a predetermined, easy-to-memorize location such as the lower center portion of the touch screen, to promote intuitive use. Whichever display page is activated on the device, a user can readily hit the same button of the apparatus to return to the main driving map display quickly. Without such an apparatus, this wouldn't be nearly as efficient and meaningful due to the lack of tactile aid, leading to the slow and inefficient vision-based process. Specifically, the user would have to visually re-acquire the right touch target on a flat screen, re-align a finger with the target, and then make sure to accurately press the aimed target, which has been evident to be a difficult process in situations such as driving a vehicle. In contrast, having such an apparatus greatly simplifies the process of acquiring the touch target because the raised physical button is distinctively different from anything displayed on the flat screen. Also the visual alignment process of a finger can be replaced by the sense of touch, and it is much easier to complete the touch action with natural tactile feedback. What's more, the touch target is effectively enlarged when the button is made larger and/or connected to a retainer, which can become the button extension so that touching the retainer can also actuate the touch command aligned with the button, as previously recited. This makes the touch operation even easier and very forgiving, and it can make operating touch screen devices much safer in circumstances like driving.

Thus, a touch screen system applying such apparatus combined with streamlined touch control designs can provide a user with truly optimized user-interfaces far superior to the mainstream practices as we experience today.

Another systemic consideration is that sometimes a user may prefer to keep such apparatus in their engaged positions at all times or even have them permanently mounted to a touch screen device. This would typically present a problem because what is beneath the apparatus are likely to be other touch commands in other display modes. For example, a touch activation area on a GPS touch screen corresponds to a "zoom in" command in one display mode, yet the touch activation area, now covered by the apparatus, may contain a plurality of small keys on a keyboard or keypad under another display mode. Permanently mounting an apparatus on or over the "zoom in" touch surface would make the keyboard partially inoperable by using the apparatus or other screen-touching means. Similarly, permanently mounting such an apparatus may block the view of the information beneath it.

To resolve the control-interference issue, those touch commands intended to be controlled by such apparatus can be programmably isolated from other practically necessary commands. This allows those other practically necessary commands be actuated by touching outside the apparatus-blocked area on the touch screen so that they won't become inoperable due to such apparatus being on or over the touch screen, permanently or movably accomplished, and there is no need to re-dispose such apparatus while operating the touch screen. Another solution is to employ other control methods, such as buttons outside the touch screen, voice commands, remote controls, etc., to actuate the other practically necessary commands that are blocked by the apparatus and inoperable by screen-touching method as earlier described. Such "other screen-touching means" and "other control methods" are collectively referred to as "alternative actuation methods" as used in the claims. In the above description, "practically necessary commands" is defined as from a user's perspective, a command or commands that are frequently used, functional and meaningful during typical use of a device, or indispensable so that a user will find it unacceptable without during normal usage of the device. For example, a "zoom-in" command on a GPS device is practically necessary, but a "display greetings" command should not be construed as such. A touch screen device can be practically fully usable without actuating commands that are not practically necessary.

To resolve the blocked-view issue, one solution is to make the apparatus transparent so that a user can see through it and sufficiently acquire the information displayed on the touch screen when the apparatus is disposed on or over the touch screen. Another solution is to make a non-transparent apparatus small enough so that the viewing of all necessary information displayed under all modes is practically unaffected. A third solution is to programmably isolate all necessary information displayed under all modes away from the area, which is blocked by the apparatus when disposed on or over the touch screen, to the extent that viewing of such information is practically unaffected. These solutions can of course be adopted in any combinations. Here "necessary information" refers to displayed information that is not irrelevant, dispensable, unimportant, or trivial and is required to sufficiently use the touch screen device. For example, a decorative pattern or trivial message display without functional purpose should not be construed as necessary information. "Practically unaffected" used above refers to a degree of effect that does not render a function or purpose useless, inaccessible, or impeded more than marginally to the extent that is unacceptable from a user's perspective. For example, usage of a GPS device should be construed as practically unaffected if the view of a small piece of map display near an edge of the screen is blurred or blocked.

With such systemic consideration and improvement in place, the apparatus can be further simplified and some embodiments can take the form of a contoured membrane laid over the touch screen or even a contoured touch screen construction by structurally integrating a button with the touch screen.

Considering the structures, operations, and benefits of these embodiments and examples illustrated so far, one will find it very easy to adopt such apparatus and systemic optimizations with an array of choices for various touch screen devices, bringing superior touch control experiences to a user in several ways. First, the user will immediately benefit from accurate, affirmative tactile cues and feedback, allowing significantly reduced reliance on visual acquisitions, interpretations, and alignments while operating a touch screen device. Second, the user will appreciate the improved touch responsiveness when a more effective touch instrument such as a shaped, more rigid button is used in lieu of a human finger to actuate touch commands. Third, the user will find it much easier to command often times miniature on-screen touch targets by instead interfacing with a very forgiving button-retainer structure that expands effective touch areas as previously recited. Fourth, the user can enjoy customized touch interfaces when different materials, shapes, surface contours, and colors etc. are incorporated into the apparatus, enhancing the intuitiveness of use and adding an element of aesthetics and persona taste. Fifth, if a touch screen device is further optimized with streamlined control designs combined with the use of such apparatus as illustrated, the user will have unprecedented better experience operating the touch screen device with dramatically improved efficiency. Whether in common environment or in demanding situations such as gaming, driving an automobile, and working on a high-speed production line, all these benefits and advantages will translate to invaluable better user experience that is faster, easier, safer, more enjoyable, and more productive.

The implementation is also very favorable from a user's perspective. An apparatus based on this invention can be made highly versatile and suitable for practically any touch screen devices as illustrated. It is very simple and cost-effective for a user to retrofit their existing touch screen devices and enjoy improved user experience immediately. Adding these apparatus can result in very little or no form factor increases. What's more, it is also very easy for an OEM to adopt this invention to optimize its touch screen products from both hardware and software perspectives and offer consumers greatly improved user-interfaces with maximized simplicity, precision, customization, and esthetics.

While the above description contains many specificities, these should not be construed as limitations on the scope, but rather as exemplifications of the embodiments thereof. Many other variations are possible based on the teachings of the disclosure.

For example, although a number of embodiments illustrated involve the use of a double-sided tape to affix the apparatus to a mounting base, it is just one of many mounting means commonly available, and alternatives include using screws, bolts-and-nuts, rivets, glue, clamps, hook-and-loop, magnets, coupled snaps, coupled protrusion-and-recess, friction mount etc. based on particular situations or user preferences.

Similarly, many mechanical structures and assemblies used with these embodiments can be equivalently modified. For example, the sixth embodiment uses a wire retainer with tips pointing outward to form a hinge assembly. These tips can be pointing inward for the same purpose as seen in the third embodiment. A hinge assembly may employ a hinge pin, or the hinge pin can be integrated on the structure of a connecting component. Likewise, a separate pivot pin can be omitted when featuring a portion of a connecting component to function as the pivot pin. When a slide assembly is referred to, it is typically interchangeable to arrange the positions between a slide member and a channel or slot receiving it, as applicable to the twelfth embodiment where slide member 1216 can be modified to have a channel and channel 1214 can be changed to a protrusion with shape and dimensions matching the modified channel so that their appearances are "swapped" but functionality remains unaffected.

For another example, this invention applies to touch screens of all types including but not limited to resistive and capacitive touch screens, and it was not intended to restrict any apparatus to any particular type of touch screens when any of the embodiments was recited. If required, it is easy to ensure that needed physical properties are featured in an apparatus to make it compatible with the particular type touch screen. For instance, to make an apparatus work with a capacitive touch screen, a button can be made of a type of applicable capacitive material or simply conductive so that it bridges the capacitive touch screen and a human finger which naturally possesses the properties needed to activate such touch screens.

Many features and connections can also be cross-applied among illustrated embodiments. For example, an apparatus can be made concealable within a device form factor whether a case is involved or not. Apparatus can be mounted on the housing of a device, a case, or any suitable surfaces that may even be an external object to the device, such as a dedicated mounting post next to a touch screen terminal. Sometimes there may be reasons to add additional components in various means coupling a button with a mounting surface without deviating from the principles of this invention.

Further, some terms should not be construed narrowly or be linked to certain shapes or structures. For example, a button used in this disclosure can be in a ball shape technically having only one surface where a user touches a first surface region to transmit the touch to a touch screen contacted by a second surface region of the button. A button can be a projected portion on a frame such as a retainer made of metal wire, an added extrusion on another part, or even a raised portion structurally integrated with a surface such as a membrane or a touch screen. A button can of course be coupled with at least another button sharing same mounting structure and may be referred to as keys, a keypad, or a keyboard.

Similarly, a retainer used in this disclosure can be a mechanical structure used to connect a button with another part, or it can be a layer of adhesive bonding a button with a surface. A means for disposing a button in a given location may include the use of such a retainer or refer to structural integration of a button with another object.

In addition, shape, size, material, or manufacturing process is not of essence to an apparatus based on this invention. Although with current state of the art, certain components are more commonly made in certain ways, such as in the first embodiment using a metal wire retainer, a sheet metal hinge bracket, a polymer button made by injection molding process, etc., all such and similar components of an apparatus according to this invention can be made of many available materials by various manufacturing processes into different shapes and sizes.

Accordingly, the invention should not be narrowly construed as the embodiments or examples described and illustrated heretofore. Reference should be made to the appended claims and their legal equivalents in determining the full scope of the invention.

What is claimed is:

1. An apparatus for operating a touch screen, comprising:
   a button having a first surface region and a second surface region adapted to be in contact with a touch instrument and said touch screen respectively so as to relay a touch action by a user to a touch activation area of said touch screen and actuate a touch command thereof, said button having physical properties tactually distinguishable from surrounding areas so as to provide said user with tactile cues and feedback while operating said touch screen thereby; and
   a retainer of which only one end attached to a mounting base selected from the group consisting of a housing of said touch screen, a case of said housing, and an external object, said retainer disposing said button in a predetermined position over said touch screen and in approximate alignment with said touch activation area by connecting said button and said mounting base along a longitudinal direction established between said button in said predetermined position and said one end of said retainer, said retainer having a smaller width in a transverse direction perpendicular to said longitudinal direction and parallel to said touch screen than the dimension of said touch screen in said transverse direction so that the portion of said retainer disposed over said touch screen moves without covering and resting against any of said housing and said case while said button moves toward said touch screen so as to increase movability of said retainer toward said touch screen and reduce viewing obstruction of said touch screen by said retainer, said button and said retainer maintaining a substantially rigid connection such that said user can effectively actuate said touch command by pressing only said retainer, whereby an extended touch zone corresponding to said touch command is established between said button and said retainer.

2. The apparatus of claim 1, wherein the sum of the widths of individual structural members of at least a substantial section of said portion of said retainer in said transverse direction is smaller than the profile span of said button in said transverse direction, whereby said button presents enlarged touchable surface for easy operation while said retainer produces reduced viewing obstruction of said touch screen when said button is in said predetermined position.

3. The apparatus of claim 1, further comprising a movable connection adapted between said button and said mounting base so that said button can be moved between an engaged position and a disengaged position in relation to said touch activation area.

4. The apparatus of claim 1, wherein said retainer is disposed parallelly to said touch screen, said button slidably attached to said retainer so that said button can slide in relation to said retainer and travel parallelly to said touch screen by a predetermined distance.

5. The apparatus of claim 4, further comprising a hinge assembly adapted between said button and said mounting base so that said button can rotate between an engaged position and a disengaged position in relation to said touch activation area, said button having a hole or slot receiving said retainer, said button maintaining position in relation to said retainer by friction between said hole or slot and said retainer.

6. The apparatus of claim 3, wherein said movable connection is a hinge assembly, said retainer made of elastic wire in approximate U-shape, the closed end of said retainer at least partially surrounding said button having a grooved portion around its circumference, the open end of said retainer having a pair of transversely extended tips aligned in the axis of said hinge assembly, said pair of transversely extended tips respectively entering a pair of accordingly aligned holes integrated or coupled with said mounting base.

7. The apparatus of claim 6, wherein said pair of accordingly aligned holes having contoured portions on two opposite surfaces interacting with said retainer so as to bias said retainer toward either said engaged position or said disengaged position.

8. The apparatus of claim 3, wherein said movable connection is a slide assembly comprising typically an elongated member and a slot or channel receiving at least partially said elongated member, said slot or channel having matching shape and dimensions with said elongated member so as to regulate the movement of said elongated member.

9. The apparatus of claim 3, wherein said movable connection is a pivot assembly comprising a pivot pin disposed perpendicularly to said touch screen, said pivot pin coupling said retainer with said mounting base such that said retainer can rotate in a plane parallel to said touch screen around said pivot pin.

10. The apparatus of claim 3, wherein said movable connection is a double-hinge assembly comprising an anchored hinge assembly, a mobile hinge assembly, and a hinge-hinge bracket connecting said anchored hinge assembly with said mobile hinge assembly, whereby said retainer of a predetermined range of lengths can be disposed to fit closely in relation to said mounting base in both said engaged position and said disengaged position.

11. The apparatus of claim 3, wherein said movable connection is a combined hinge and pivot assembly comprising a hinge assembly, a pivot assembly, and a hinge-pivot bracket connecting said hinge assembly with said pivot assembly, said pivot assembly having a pivot pin coupling said hinge-pivot bracket with said mounting base, said hinge-pivot bracket rotatable around said pivot pin in relation to said mounting base, whereby said retainer of a predetermined range of lengths can be disposed to fit closely in relation to said mounting base in both said engaged position and said disengaged position.

12. The apparatus of claim 3, wherein said movable connection is a combined hinge and slide assembly comprising a slide assembly and a hinge assembly having a hinge pin, said slide assembly having a slot or channel receiving said hinge pin or an extended portion of said hinge pin so that said retainer can both rotate and slide in relation to said slot or channel, whereby said retainer of a predetermined range of lengths can be disposed to fit closely in relation to said mounting base in both said engaged position and said disengaged position.

13. The apparatus of claim 1, further comprising a channel or slot integrated or coupled with said mounting base and a slide member slidably connected to said channel or slot having matching shape and dimensions with said slide member so as to regulate the movement of said slide member, said button coupled to said slide member so as to be able to travel in a first direction defined by the sliding movement between said slide member and said channel or slot.

14. The apparatus of claim 13, wherein said button is slidably attached to said retainer, said retainer disposed over said touch screen, said first direction approximately perpendicular to a second direction defined by the sliding movement between said button and said retainer, whereby said button can be disposed along the combination of said first direction and said second direction so as to reach a predetermined range of touch activation areas on said touch screen.

15. The apparatus of claim 13, wherein said retainer is retractable so as to alter the length of said retainer, whereby said button can be disposed along the combination of said first direction and the retractable range of said retainer so as to reach a predetermined range of touch activations areas on said touch screen.

16. A method of operating an electronic device having a touch screen, comprising:
(a) providing a first control command actuatable by touching a first predetermined area on said touch screen;
(b) providing a first button having a first surface region and a second surface region adapted to be in contact with a touch instrument and said first predetermined area respectively so as to relay a touch action by a user and actuate said first control command, said first button having physical properties tactually distinguishable from surrounding areas so as to provide tactile cues and feedback;
(c) providing a retainer of which only one end attached to a mounting base selected from the group consisting of a housing of said touch screen, a case of said housing, and an external object, said retainer disposing said first button in a predetermined position over said touch screen and in approximate alignment with said first predetermined area by connecting said first button and said mounting base along a longitudinal direction established between said first button in said predetermined position and said one end of said retainer, said retainer having a smaller width in a transverse direction perpendicular to said longitudinal direction and parallel to said touch screen than the dimension of said touch screen in said transverse direction so that the portion of said retainer disposed over said touch screen moves without covering and resting against any of said housing and said case while said first button moves toward said touch screen so as to increase movability of said retainer toward said touch screen and reduce viewing obstruction of said touch screen by said retainer, said first button and said retainer maintaining a substantially rigid connection such that said user can effectively actuate said first control command by pressing only said retainer, whereby an extended touch zone corresponding to said first control command is established between said first button and said retainer;
(d) recognizing and targeting said retainer;
(e) contacting said retainer with said touch instrument and receiving tactile confirmation; and
(f) pressing said retainer to actuate said first control command.

17. The method of claim 16, wherein the sum of the widths of individual structural members of at least a substantial section of said portion of said retainer in said transverse direction is smaller than the profile span of said first button in said transverse direction, whereby said first button presents enlarged touchable surface for easy operation while said retainer produces reduced viewing obstruction of said touch screen when said first button is in said predetermined position.

18. The method of claim 16, further comprising providing a hinge assembly between said first button and said electronic device so that said first button can rotate between an engaged position and a disengaged position in relation to said first predetermined area, said retainer is made of elastic wire in approximate U-shape, the open end of said retainer having a pair of transversely extended tips aligned in the axis of said hinge assembly, said pair of transversely extended tips respectively entering a pair of accordingly aligned holes contained in said hinge assembly.

19. The method of claim 16, further comprising:
(a) providing a second control command actuatable by touching a second predetermined area on said touch screen;
(b) adapting a second button having tactually distinguishable surface contour or texture from said first button to be in contact with said second predetermined area so as to actuate said second control command;
(c) tactually locating said second button based on said tactually distinguishable surface contour or texture; and
(d) pressing said second button to actuate said second control command.

20. The method of claim 16, further comprising:
(a) providing a second control command actuatable by touching a second predetermined area on said touch screen;
(b) adapting a second button having a different color identifier from said first button to be in contact with said second predetermined area so as to actuate said second control command;
(c) identifying said second button by said different color identifier;
(d) tactually locating said second button; and
(e) pressing said second button to actuate said second control command.

21. The apparatus of claim 6, wherein said retainer having a predetermined amount of expanding pressure against said pair of accordingly aligned holes such that said retainer and said pair of accordingly aligned holes can maintain their relative position at any angle within a predetermined range by friction therebetween.

22. The apparatus of claim 5, further comprising a hinge bracket made of spring sheet metal, said retainer made of metal wire in approximate U-shape, said hinge bracket having a substantially enclosed hinge portion receiving the close end of said retainer, said substantially enclosed hinge portion having a smaller inner diameter than the diameter of said close end of said retainer such that said retainer and said hinge bracket can maintain their relative position at any angle within a predetermined range by friction therebetween.

23. The apparatus of claim 22, further comprising a double-sided tape adapted between said hinge bracket and said mounting base, said doubled-sided tape affixing said hinge bracket to said mounting base.

* * * * *